United States Patent
Hartman et al.

(10) Patent No.: US 7,133,239 B1
(45) Date of Patent: Nov. 7, 2006

(54) METHODS AND APPARATUSES FOR WRITING SPIRAL SERVO PATTERNS ONTO A DISK SURFACE

(75) Inventors: Allen P. Hartman, Thornton, CO (US); Bruce A. Liikanen, Berthoud, CO (US); Dave McMurtrey, Loveland, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/788,242

(22) Filed: Feb. 26, 2004

Related U.S. Application Data

(63) Continuation-in-part of application No. 09/923,570, filed on Aug. 6, 2001, and a continuation-in-part of application No. 09/853,093, filed on May 9, 2001, now abandoned.

(60) Provisional application No. 60/285,055, filed on Apr. 19, 2001, provisional application No. 60/223,446, filed on Aug. 4, 2000, provisional application No. 60/203,159, filed on May 9, 2000.

(51) Int. Cl.
*G11B 21/02* (2006.01)

(52) U.S. Cl. ...................................... 360/75
(58) Field of Classification Search .............. None
See application file for complete search history.

(56) References Cited

U.S. PATENT DOCUMENTS

| | | | |
|---|---|---|---|
| 4,157,577 A * | 6/1979 | Porter et al. ............ 360/78.14 |
| 4,587,579 A * | 5/1986 | Cocke et al. ............... 360/75 |
| 5,003,412 A | 3/1991 | Bizjak et al. |
| 5,119,248 A * | 6/1992 | Bizjak et al. ................. 360/75 |
| 5,164,863 A * | 11/1992 | Janz ........................... 360/57 |
| 5,519,546 A | 5/1996 | Lewis |
| 5,583,712 A | 12/1996 | Brunelle |
| 5,668,679 A * | 9/1997 | Swearingen et al. .......... 360/75 |
| 5,793,559 A | 8/1998 | Shepherd et al. |
| 6,084,738 A | 7/2000 | Duffy |
| 6,091,564 A | 7/2000 | Codilian et al. |
| 6,144,517 A | 11/2000 | Watanabe et al. |
| 6,388,833 B1 | 5/2002 | Golowka et al. |
| 6,476,995 B1 | 11/2002 | Liu et al. |
| 6,507,450 B1 | 1/2003 | Elliott |
| 6,587,293 B1 | 7/2003 | Ding et al. |
| 6,674,593 B1 | 1/2004 | Jolly et al. |
| 6,714,376 B1 | 3/2004 | Brunnett et al. |
| 6,937,420 B1 | 8/2005 | McNab et al. |
| 6,943,978 B1 * | 9/2005 | Lee ............................ 360/75 |

FOREIGN PATENT DOCUMENTS

JP 02297780 A * 12/1990

* cited by examiner

*Primary Examiner*—Hoa T. Nguyen
*Assistant Examiner*—James L Habermehl
(74) *Attorney, Agent, or Firm*—Tejpal S. Hansra

(57) ABSTRACT

Methods and apparatuses for writing spiral servo patterns on a disk surface are disclosed. In one embodiment, a method is provided to write servo information onto a disk surface in spiral patterns in a non-sequential manner. In another embodiment, a thermal warm-up regimen is performed prior to writing spiral patterns onto the disk surface. In another embodiment, a reference track is used to position a write head when writing spiral patterns onto the disk surface. By using one or more of the above embodiments, the affects of thermal and/or mechanical changes may be reduced when writing spiral patterns.

66 Claims, 27 Drawing Sheets

FIG. 10

$$\left(\frac{X \text{ rev}}{\text{min}}\right)\left(\frac{\text{min}}{60 \text{ sec}}\right)\left(\frac{Y \text{ sec}}{\text{int}}\right) = \left(\frac{\text{Rev}}{Z \text{ int}}\right) \quad :[\text{EQUATION 1}]$$

EXAMPLE 1: FOR $Z = \frac{160 \text{ int}}{\text{Rev}}$ $$Y = \frac{68 \text{ u sec}}{\text{int}}$$

$$\Rightarrow X = \frac{60 \text{ sec}}{\text{min}} \quad \frac{\text{int}}{68 \text{ u sec}} \quad \frac{\text{Rev}}{160 \text{ int}} = 5514.705 \text{ RPM}$$

EXAMPLE 2: FOR X = 5700 RPM $$Z = \frac{160 \text{ int}}{\text{Rev}}$$

$$\Rightarrow Y = \frac{60 \text{ sec}}{\text{min}} \quad \frac{\text{min}}{5700 \text{ Rev}} \quad \frac{\text{Rev}}{160 \text{ int}} = \frac{65.789 \text{ u sec}}{\text{int}}$$

FIG. 11

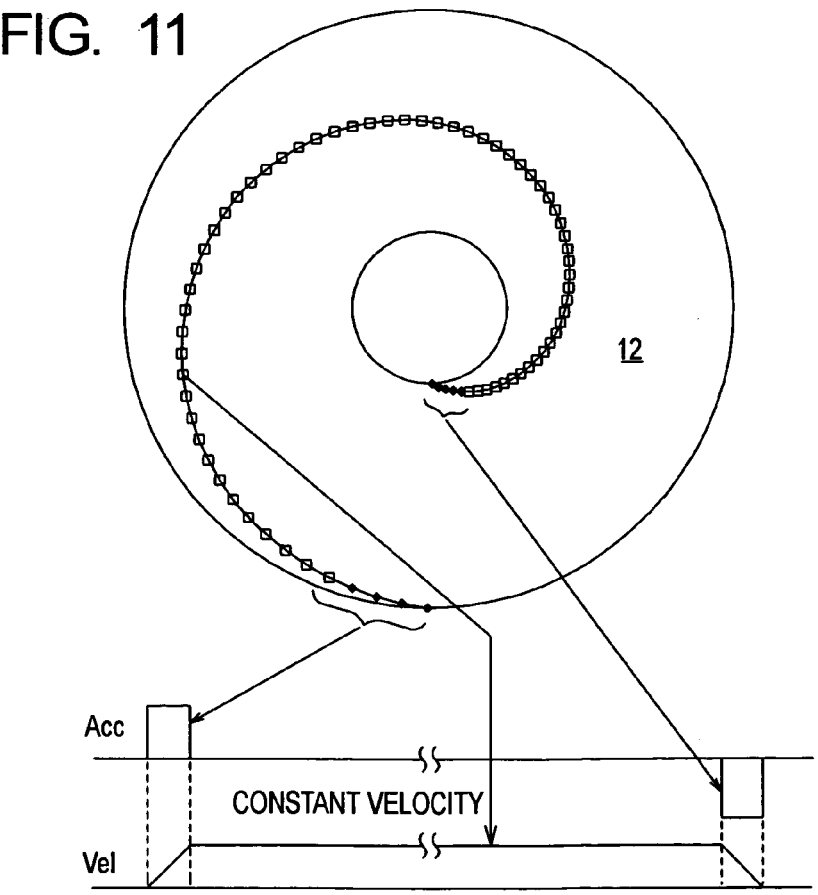

FIG. 15A
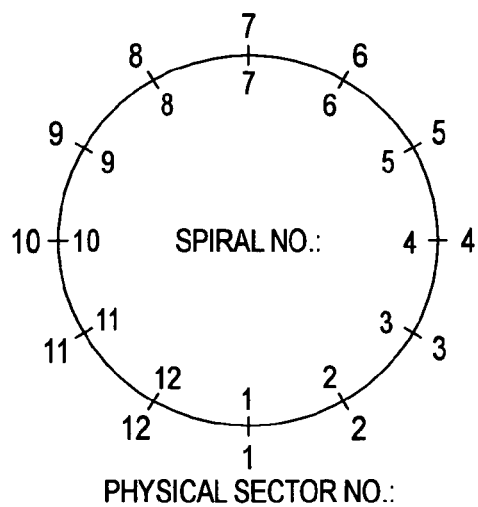
PHYSICAL SECTOR NO.:
FIG. 15B
SEQUENTIAL:
| PHYS. SEC. | SPIRAL NO. | DELTA |
|---|---|---|
| 1 | 1 |  |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |
| 10 | 10 | 1 |
| 11 | 11 | 1 |
| 12 | 12 | 1 |
| 1 | 1 | 11 |
| | |
|---|---|
| MIN. DELTA: | 1 |
| MAX. DELTA: | 11 |
| AVERAGE DELTA: | 1.833 |
| MEDIAN DELTA: | 1.000 |
| STD. DEV. DELTA: | 2.764 |
| VAR. DELTA: | 7.639 |
FIG. 15C
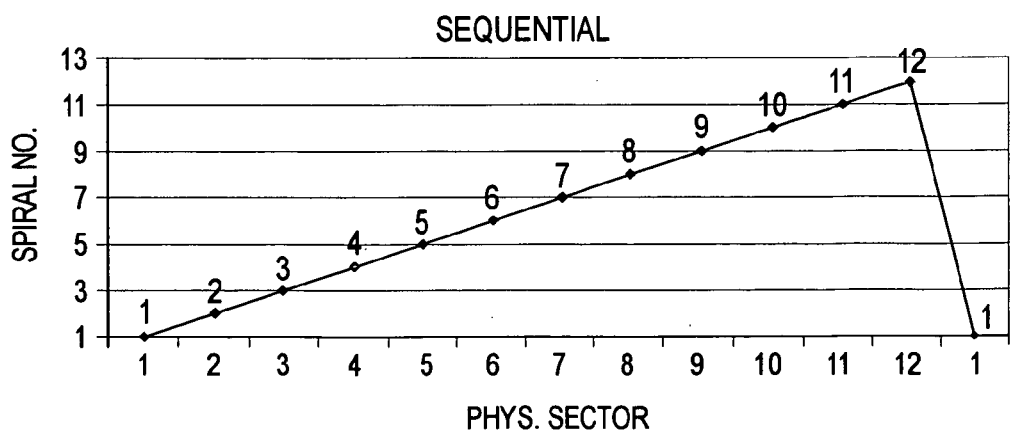

FIG. 17A

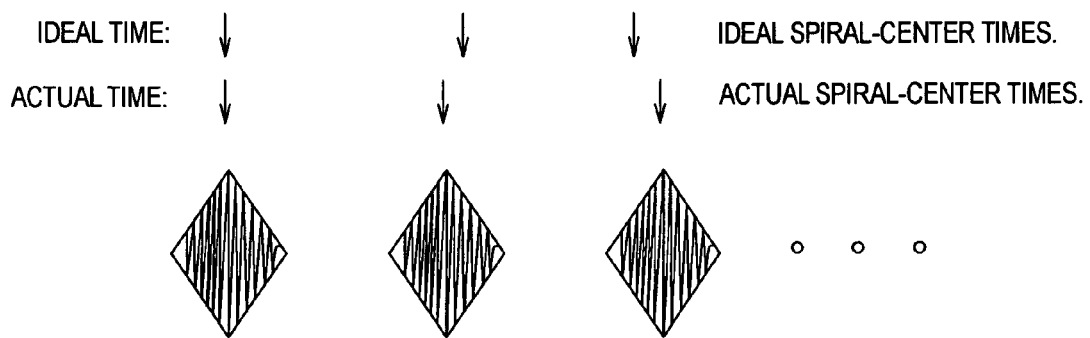

TWO BASIC MEASUREMENTS ARE MADE:

DELTA-TIME: TAKES (DELTA ACTUAL) - (DELTA IDEAL) PTS. AND PLOTS THIS ERROR VS. SPIRAL LOCATION.

RUNNING-TIME: RELATIVE TO AN ARBITRARY STARTING PT. TAKES (CUMULATIVE ACTUAL) - (CUMULATIVE IDEAL) PTS. AND PLOTS THIS ERROR VS. SPIRAL LOCATION.

TWO PLOTS ARE SHOWN WHERE FICTITIOUS SPIRALS ARE CONSISTENTLY PLACED 69 µSEC APART AS COMPARED TO AN IDEAL 70 µSEC PLACEMENT.

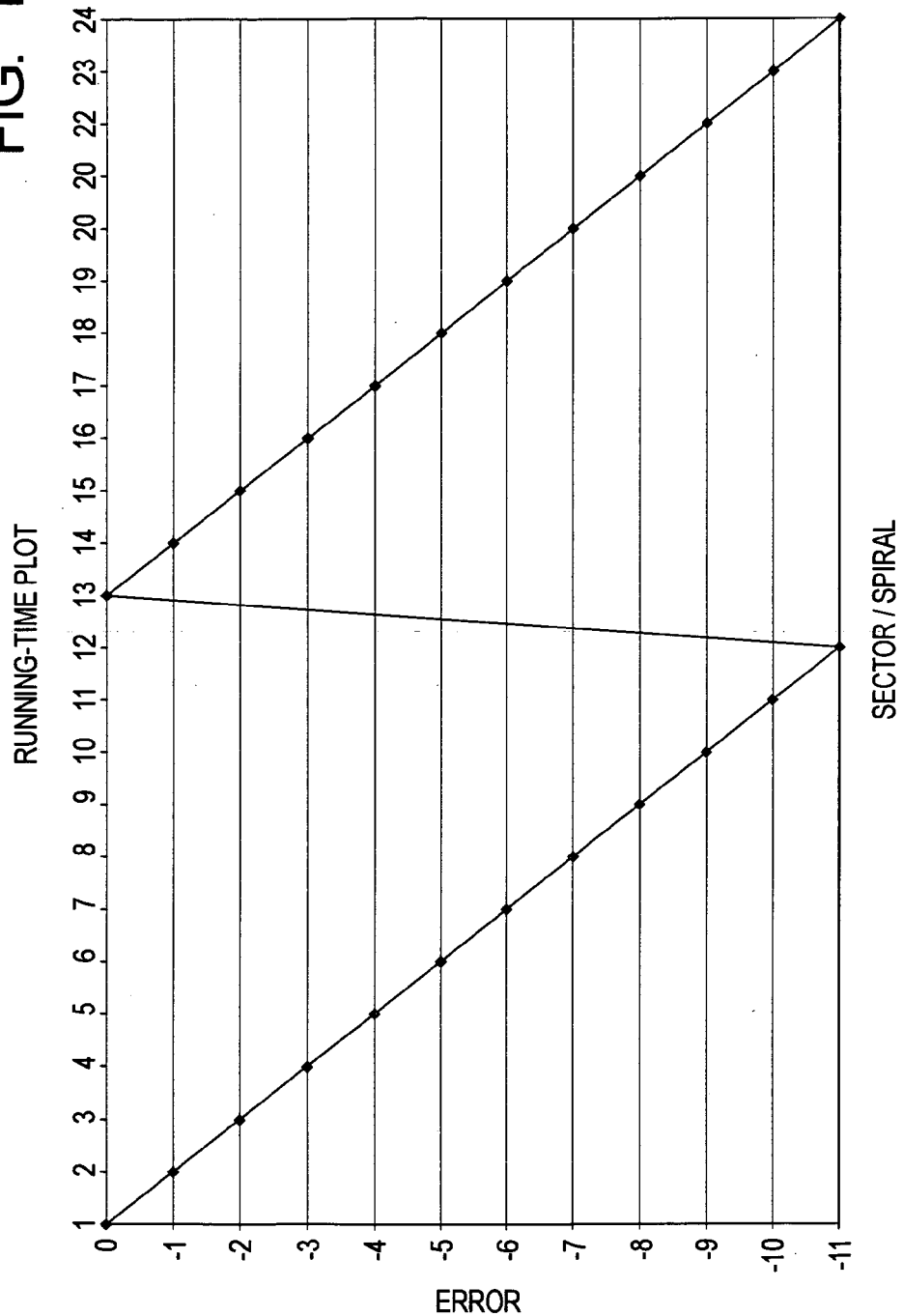

FIG. 17D

| INDEX: | SPIRAL: | IDEAL: | MEAS: | DELTA: | RUNNING: |
|---|---|---|---|---|---|
| 1 | 1 | 0 | 0 | 11 | 0 |
| 2 | 2 | 70 | 69 | -1 | -1 |
| 3 | 3 | 140 | 138 | -1 | -2 |
| 4 | 4 | 210 | 207 | -1 | -3 |
| 5 | 5 | 280 | 276 | -1 | -4 |
| 6 | 6 | 350 | 345 | -1 | -5 |
| 7 | 7 | 420 | 414 | -1 | -6 |
| 8 | 8 | 490 | 483 | -1 | -7 |
| 9 | 9 | 560 | 552 | -1 | -8 |
| 10 | 10 | 630 | 621 | -1 | -9 |
| 11 | 11 | 700 | 690 | -1 | -10 |
| 12 | 12 | 770 | 759 | -1 | -11 |
| 13 | 1 | 0 | 0 | 11 | 0 |
| 14 | 2 | 70 | 69 | -1 | -1 |
| 15 | 3 | 140 | 138 | -1 | -2 |
| 16 | 4 | 210 | 207 | -1 | -3 |
| 17 | 5 | 280 | 276 | -1 | -4 |
| 18 | 6 | 350 | 345 | -1 | -5 |
| 19 | 7 | 420 | 414 | -1 | -6 |
| 20 | 8 | 490 | 483 | -1 | -7 |
| 21 | 9 | 560 | 552 | -1 | -8 |
| 22 | 10 | 630 | 621 | -1 | -9 |
| 23 | 11 | 700 | 690 | -1 | -10 |
| 24 | 12 | 770 | 759 | -1 | -11 |

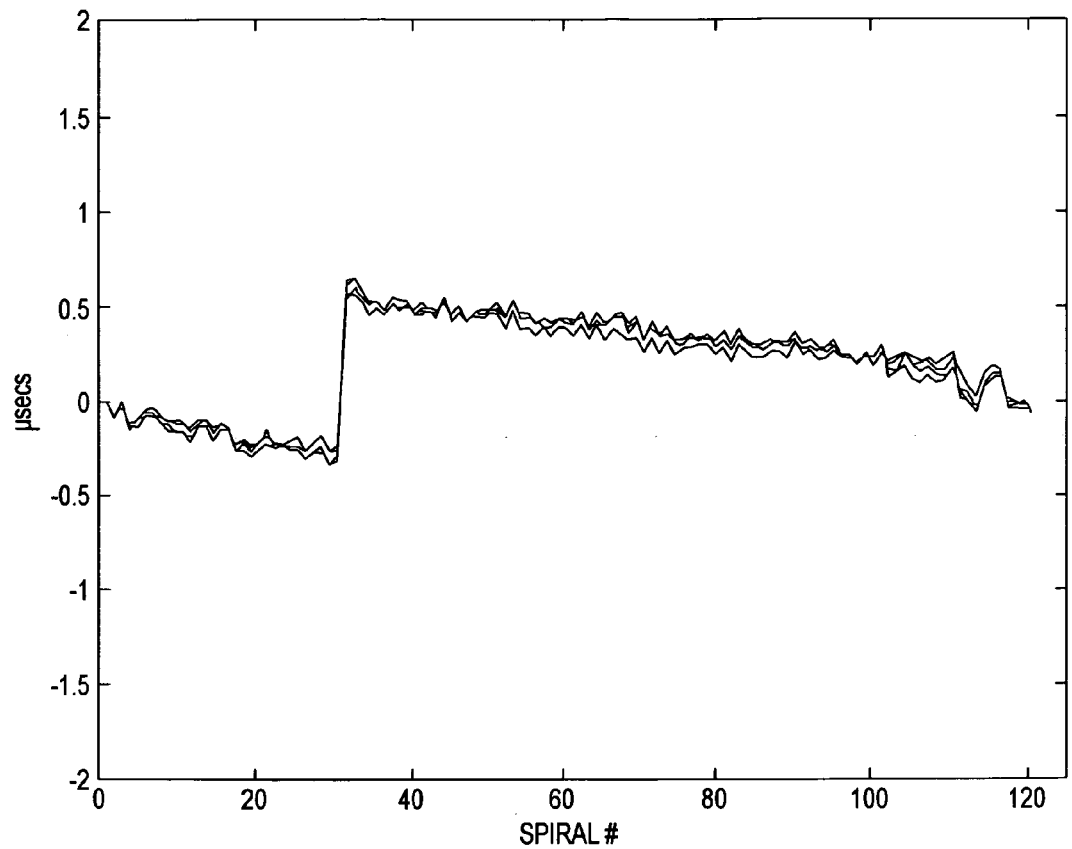

FIG. 19A
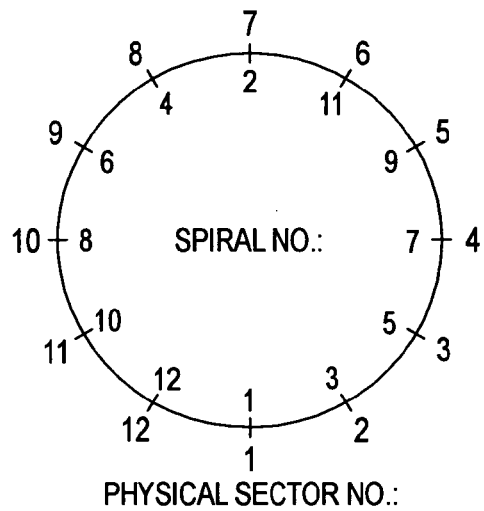
PHYSICAL SECTOR NO.:
FIG. 19B
BISECTION SEQ. 180 DEG. PAIRS:
| PHYS. SEC. | SPIRAL NO. | DELTA |
|---|---|---|
| 1 | 1 | |
| 2 | 3 | 2 |
| 3 | 5 | 2 |
| 4 | 7 | 2 |
| 5 | 9 | 2 |
| 6 | 11 | 2 |
| 7 | 2 | 9 |
| 8 | 4 | 2 |
| 9 | 6 | 2 |
| 10 | 8 | 2 |
| 11 | 10 | 2 |
| 12 | 12 | 2 |
| 1 | 1 | 11 |
MIN. DELTA: 2
MAX. DELTA: 11
AVERAGE DELTA: 3.333
MEDIAN DELTA: 2.000
STD. DEV. DELTA: 3.009
VAR. DELTA: 9.056
FIG. 19C
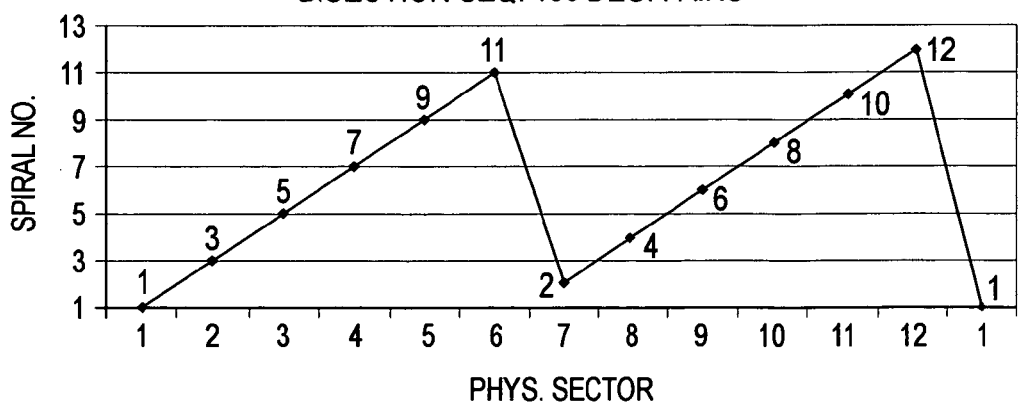

FIG. 20A
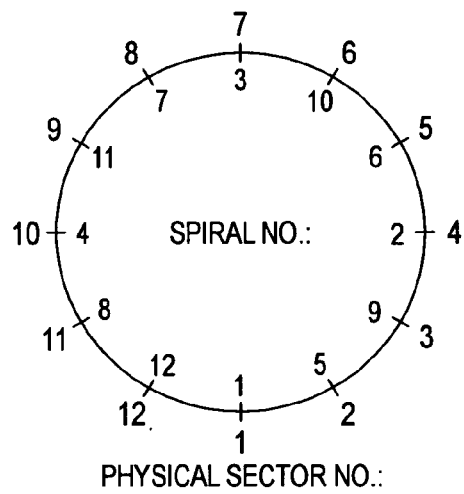
PHYSICAL SECTOR NO.:
FIG. 20B
SEQUENTIAL 90 DEG. QUADS:
| PHYS. SEC. | SPIRAL NO. | DELTA |
|---|---|---|
| 1 | 1 | |
| 2 | 5 | 4 |
| 3 | 9 | 4 |
| 4 | 2 | 7 |
| 5 | 6 | 4 |
| 6 | 10 | 4 |
| 7 | 3 | 7 |
| 8 | 7 | 4 |
| 9 | 11 | 4 |
| 10 | 4 | 7 |
| 11 | 8 | 4 |
| 12 | 12 | 4 |
| 1 | 1 | 11 |
| | |
|---|---|
| MIN. DELTA: | 4 |
| MAX. DELTA: | 11 |
| AVERAGE DELTA: | 5.333 |
| MEDIAN DELTA: | 4.000 |
| STD. DEV. DELTA: | 2.134 |
| VAR. DELTA: | 4.556 |
FIG. 20C
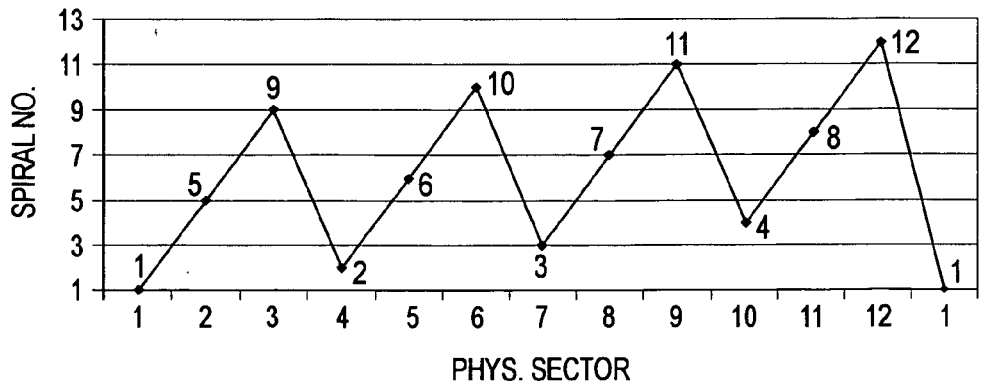

FIG. 21A
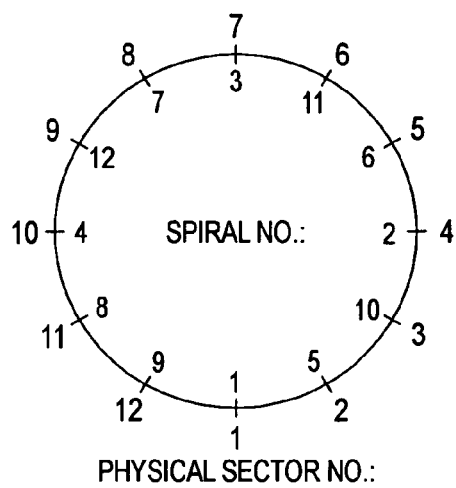
PHYSICAL SECTOR NO.:
FIG. 21B
HOUR GLASS MOD. 90 DEG. QUADS:
| PHYS. SEC. | SPIRAL NO. | DELTA |
|---|---|---|
| 1 | 1 | |
| 2 | 5 | 4 |
| 3 | 10 | 5 |
| 4 | 2 | 8 |
| 5 | 6 | 4 |
| 6 | 11 | 5 |
| 7 | 3 | 8 |
| 8 | 7 | 4 |
| 9 | 12 | 5 |
| 10 | 4 | 8 |
| 11 | 8 | 4 |
| 12 | 9 | 1 |
| 1 | 1 | 8 |
MIN. DELTA: 1
MAX. DELTA: 8
AVERAGE DELTA: 5.333
MEDIAN DELTA: 5.000
STD. DEV. DELTA: 2.134
VAR. DELTA: 4.556
FIG. 21C
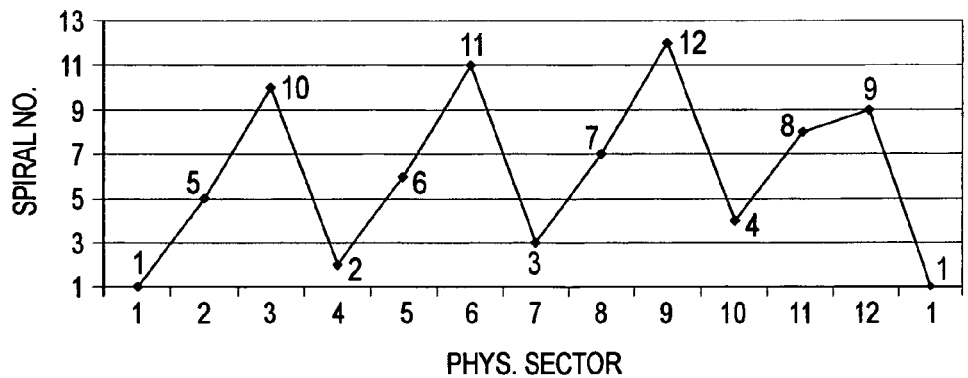

FIG. 22A
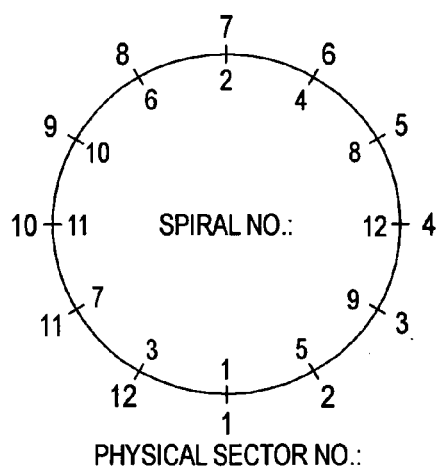
SPIRAL NO.:
PHYSICAL SECTOR NO.:
FIG. 22B
HOUR GLASS MOD. 180 DEG. PAIRS:
| PHYS. SEC. | SPIRAL NO. | DELTA |
|---|---|---|
| 1 | 1 | |
| 2 | 5 | 4 |
| 3 | 9 | 4 |
| 4 | 12 | 3 |
| 5 | 8 | 4 |
| 6 | 4 | 4 |
| 7 | 2 | 2 |
| 8 | 6 | 4 |
| 9 | 10 | 4 |
| 10 | 11 | 1 |
| 11 | 7 | 4 |
| 12 | 3 | 4 |
| 1 | 1 | 2 |
| | |
|---|---|
| MIN. DELTA: | 1 |
| MAX. DELTA: | 4 |
| AVERAGE DELTA: | 3.333 |
| MEDIAN DELTA: | 4.000 |
| STD. DEV. DELTA: | 1.027 |
| VAR. DELTA: | 1.056 |
FIG. 22C
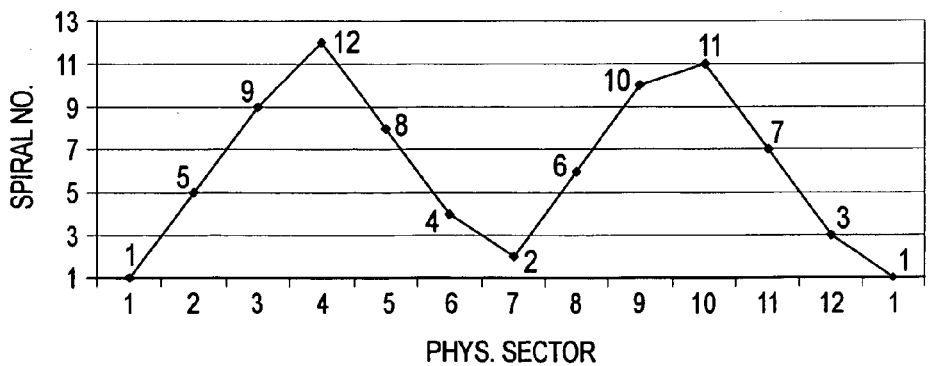

CONSECUTIVE SPIRAL SPACING DEVIATION
FROM 74.67 μsec NOMINAL SPACING

MAX. DEVIATION: 0.17 μsecs

DRIVE S/N: t6h45soc STW: LCA 1/2 TRACK: 55000 02/23/01 15:54:22

SPIRAL TIMING DEVIATION FROM IDEAL ABSOLUTE TIMING

PEAK-PEAK VARIATION: 0.87 μsecs

DRIVE S/N: t6h45soc STW: LCA 1/2 TRACK: 55000 02/23/01 15:54:22

FIG. 23A
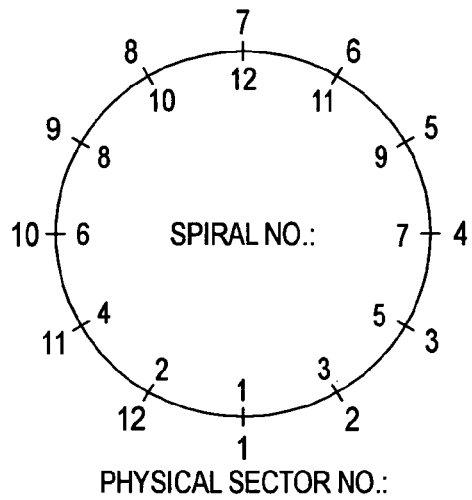
PHYSICAL SECTOR NO.:
FIG. 23B
SINGLE STEP ALT. MOD.:
| PHYS. SEC. | SPIRAL NO. | DELTA |
|---|---|---|
| 1 | 1 | |
| 2 | 3 | 2 |
| 3 | 5 | 2 |
| 4 | 7 | 2 |
| 5 | 9 | 2 |
| 6 | 11 | 2 |
| 7 | 12 | 1 |
| 8 | 10 | 2 |
| 9 | 8 | 2 |
| 10 | 6 | 2 |
| 11 | 4 | 2 |
| 12 | 2 | 2 |
| 1 | 1 | 1 |
| | |
|---|---|
| MIN. DELTA: | 1 |
| MAX. DELTA: | 2 |
| AVERAGE DELTA: | 1.833 |
| MEDIAN DELTA: | 2.000 |
| STD. DEV. DELTA: | 0.373 |
| VAR. DELTA: | 0.139 |
FIG. 23C
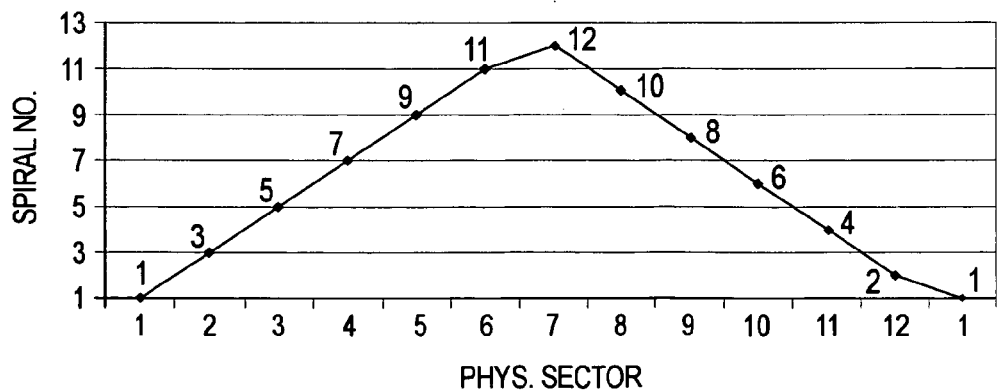

SPIRAL TIMING DEVIATION FROM IDEAL ABSOLUTE TIMING

PEAK-PEAK VARIATION: 1.48 μsecs

DRIVE S/N: 5P8 STW: LCA 1/2 TRACK: 55000 02/16/01 09:11:23

METHODS AND APPARATUSES FOR WRITING SPIRAL SERVO PATTERNS ONTO A DISK SURFACE

CROSS-REFERENCE TO RELATED APPLICATIONS

This is a continuation-in-part of both: (1) U.S. patent application Ser. No. 09/923,570 filed Aug. 6, 2001, which claims priority from U.S. Provisional Patent Application Ser. No. 60/223,446 filed Aug. 4, 2000; and, (2) U.S. patent application Ser. No. 09/853,093 filed May 9, 2001 now abandoned, which claims priority from U.S. Provisional Patent Application Ser. No. 60/285,055 filed Apr. 19, 2001, U.S. Provisional Patent Application Ser. No. 60/223,446 filed Aug. 4, 2000 and U.S. Provisional Patent Application Ser. No. 60/203,159 filed May 9, 2000. All of the aforementioned applications are incorporated herein by reference in their entireties.

INCORPORATION BY REFERENCE

U.S. patent application Ser. No. 10/126,917 filed Apr. 19, 2002 is also incorporated herein by reference in its entirety.

FIELD OF THE INVENTION

The present invention relates to computer disk drives. More particularly, the present invention relates to writing servo information onto one or more disk surfaces of a disk drive, wherein the servo information is written in a spiral fashion.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16.

The disk drive 10 also includes an actuator arm assembly 18, which includes a transducer 20 (wherein the transducer has both a write head and a read head) mounted to a flexure arm 22. The actuator arm assembly 18 is attached to an actuator arm 24 that can rotate about a bearing assembly 26. A voice coil motor 28 cooperates with the actuator arm 24 and, hence, the actuator arm assembly 18, to move the transducer 20 relative to the disk 12. The spin motor 14, voice coil motor 28 and transducer 20 are coupled to a number of electronic circuits 30 mounted to a printed circuit board 31. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 32 via an input/output port 34. The disk drive 10 is used by the host computer 32 as a data storage device. The host 32 delivers data access requests to the disk drive 10 via port 34. In addition, port 34 is used to transfer customer data between the disk drive 10 and the host 32 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 (i.e., the read head) above a desired track of the disk 12 and sensing the magnetic polarity transitions stored within the track, as the track moves below the transducer 20. Similarly, data is "written" to the disk 12 by positioning the transducer 20 (i.e., the write head) above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$ in response to, among other things, an access command received from the host computer 32 via the interface 40.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 32 into a write current signal that is delivered to the transducer 20 to "write" the customer data to an appropriate portion of the disk 12. The read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 that each cross all of the tracks 42 on the disk 12. The servo information in the servo spokes 44 is read by the transducer 20 during disk drive operation for use in positioning the transducer 20 above a desired track 42 of the disk 12. The portions of the track between servo spokes 44 have traditionally been used to store customer data received from, for example, the host computer 32 and are thus referred to herein as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of writing servo information on the disk surface with a high degree of positional accuracy. In general, a STW is a very expensive piece of capital equipment. Thus, it is generally desirable that a STW be used as efficiently as possible during manufacturing operations. Even a small reduction in the amount of data needed to be written by the STW per disk surface can result in a significant cost and time savings.

FIG. 4 depicts, in block diagram form, certain portions of a conventional servo track writer 50 and a disk drive 10. Only those components that are used to position the disk drive's actuator arm assembly 18 radially relative to the center of the disk surface are shown in FIG. 4. Among other things, the servo track writer 50 includes an STW digital signal processor (DSP) 52, a STW voice-coil motor (VCM) 54, a STW actuator arm assembly 56 and a push-pin system 58.

In order to write servo information on to a disk surface 12, the disk drive 10 is loaded onto the STW 50 and is held securely in place. One of a variety of push-pin systems 58 (e.g., a mechanical push-pin system or an optical push-pin system) is used to create an interface between the actuator arm assembly 18 of disk drive 10 and the actuator arm assembly 56 of the servo track writer 50. By properly positioning the STW actuator arm assembly 56, the actuator arm assembly 18 and, hence, the transducer 20 of the disk drive 10 may be positioned at an appropriate location relative to the center of the disk surface 12. In order to effectuate this positioning, the STW 50 uses a servo loop formed by an external relative encoder (see block 70 in FIG. 6), which cooperates with (or forms a part of) the STW VCM 54, and a compensation circuit (see block 70 in FIG. 6).

Once the transducer 20 is appropriately positioned relative to the disk surface 12, servo information is then written by the transducer 20 onto the disk surface 12 at the particular radial location. Subsequently, the STW actuator arm assembly 56 is used to position the actuator arm assembly 18 of the disk drive 10 at a next radial location and servo information is written at this radial location. The process repeats until servo information is written at all predetermined radial locations across the disk surface 12.

As shown in FIG. 4, the STW 50 also includes a crystal 60 and a divide-by-N circuit 62 which are used to provide a series of interrupt signals 64 (see FIG. 5) to the STW DSP 52 at predetermined sample times, $T_s$. Upon receipt of an interrupt signal 64, the STW DSP 52 performs an interrupt service routine (ISR) 66, which last for a duration generally less than the sample time, $T_s$, as indicated by the brackets shown in FIG. 5.

FIG. 6 depicts, in block diagram form, the steps of a conventional interrupt service routine. As shown in FIG. 6, the ISR broadly includes the steps of: profile generation (block 68), STW servo loop closure, whereby the generated profile is followed (block 70), and communication/housekeeping between the host computer 32 and the STW DSP 52 (block 72).

Although not shown in FIG. 4, the STW 50 also includes an external clock head assembly and a phase-locked loop (PLL). The external clock head is used for reading a clock track that has been written on the disk surface 12 using conventional techniques. The phase-locked loop (PLL) is provided to maintain very accurate physical transitions relative to the disk surface 12. Importantly, in the conventional STW 50, the transducers 20 of the disk drive 10 are "placed" and "held" at radial positions relative to the center of the disk 12 completely independently from the clock PLL. It is only after the transducers have been "placed" at a radial position that the transducers 20 write the appropriate servo pattern clocked out by the PLL clock via a pattern generator, which keeps track of the circumferential position. After the servo pattern has been written, the transducers 20 are moved to the next radial position (again, independent from the clock PLL) and the process is repeated. Eventually, servo information is written across the entire disk surface to form the servo spokes 44 shown in FIG. 3.

Because servo information is currently written by placing transducers at radial locations across the disk surface and then writing servo information which is used to define a track, the time for writing servo information increases as the total number of tracks able to be placed on a disk surface increases. Since the number of tracks per inch (TPI) continues to increase, manufacturing times are likely to continue to increase, unless more servo track writers are supplied. However, as alluded to above, the purchase of additional servo track writers involves a significant capital expense.

In order to solve this problem and to expedite the manner by which servo information is written onto a disk surface (among other things), it has been determined that it would be beneficial to write servo information in spiral patterns (see, U.S. patent application Ser. No. 09/853,093 filed May 9, 2001 and U.S. patent application Ser. No. 10/126,917 filed Apr. 19, 2002, both of which are incorporated herein by reference in their entireties). FIG. 7 is a simplified diagrammatic representation of first and second spiral patterns 100, 102 written onto a disk surface 12. Each of the spiral patterns 100, 102 is written while the transducer 20 is dynamically moved across the disk surface 12 at a constant or variable velocity. The spiral patterns 100, 102 may include a constant frequency pattern with sync marks (represented by black squares in FIG. 7) imbedded therein. During operation of the disk drive 10 or during a self-servo writing process, the sync marks are used to position a transducer 20 over the disk surface 12 and, hence, forms (at least a part of) either the final or some intermediate servo information.

Writing servo information in such a manner presents a number of new problems. For example, since the transducer 20 is not "placed" and "held" at a particular radius relative to the center of the disk surface 12 before servo information is written, it would be desirable to develop a method for ensuring that corresponding sync marks along different spirals are located along the same radius. Furthermore, it would be desirable to develop a method for ensuring that the circumferential distance between adjacent sync marks along the same radius is equivalent. Reference is made to FIG. 8, which is diagrammatic representation of a fragmentary top view of a disk surface 12 having two spiral patterns written thereon, to illustrate these points.

As shown in FIG. 8, portions of Spiral N and Spiral N+1 are written on disk surface 12. A first sync mark 104 associated with Spiral N is written along Spiral N near the outer diameter of the disk surface 12. Similarly, a first sync mark 106 associated with Spiral N+1 is written along Spiral N+1 near the outer diameter of the disk surface 12. For the servo information to properly perform its function, sync mark X of Spiral N and sync mark X of Spiral N+1 should lie on the same radius R relative to the center 108 of the disk 12. Furthermore, the circumferential distance between adjacent sync marks along the same radius should be the same. For example, the circumferential distance between adjacent sync marks that lie along radius R should be equal to the circumferential distance D between sync mark X of Spiral N and sync mark X of Spiral N+1.

A further problem is that, as mentioned above, servo track writers are extremely expensive instruments. Accordingly, replacing existing servo track writers with new servo track writers that are used to write servo information in spiral patterns would be extremely expensive. Thus, it would be beneficial to develop a method for writing servo information using spiral patterns by minimally modifying existing servo track writers, rather than requiring altogether new servo track writers.

Yet a further problem is that thermal and/or mechanical changes which occur between the time a first spiral pattern is written and the time a last (or even adjacent) spiral pattern is written may cause large discontinuities (or closure errors). Accordingly, it would be beneficial to devise a method of writing spiral patterns which either reduces the closure errors or which predicts the type of closure errors that are likely to occur, so that the disk drive's servo system may compensate for such closure errors.

SUMMARY OF THE INVENTION

The present invention is designed to address at least one of the aforementioned needs.

The present disclosure describes methods and apparatuses for writing spiral servo patterns onto a disk surface. In one embodiment, a method is provided to write servo information onto a disk surface in spiral patterns in a non-sequential manner. In another embodiment, a thermal warm-up regimen is performed prior to writing spiral patterns onto the disk surface. In another embodiment, a reference track is used to position a write head when writing spiral patterns onto the disk surface. By using one or more of the above embodiments, the affects of thermal and/or mechanical changes may be reduced when writing spiral patterns.

Other embodiments, objects, features and advantages of the invention will be apparent from the following specification taken in conjunction with the following drawings.

BRIEF DESCRIPTION OF THE DRAWINGS

FIG. 10 illustrates an equation showing the relationship between spindle speed X (in units of revolutions per minute), the interrupt rate Y (in units of seconds per interrupt) and the number of interrupts per revolution Z (in units of interrupts per revolution), along with two illustrative example calculations;

FIG. 11 is a diagrammatic representation illustrating acceleration and velocity curves along a disk surface for one embodiment of a "write portion" of a spiral profile;

FIG. 15A is a diagrammatic representation illustrating physical sector numbers and spiral numbers for spirals written in a sequential manner;

FIG. 15B is a table summarizing data associated with writing spirals in a sequential manner;

FIG. 15C is a graph plotting spiral number versus physical sector for spirals written in a sequential manner;

FIG. 17A is a diagrammatic representation of a measurement technique that may be used to predict discontinuities and/or closure errors relating to the order of writing spirals;

FIG. 17C is a graph illustrating accumulated errors associated with certain physical sectors for spirals that have been written sequentially;

FIG. 17D is a table setting forth data used to plot the graphs of FIGS. 17B and 17C;

FIGS. 18A and 18B illustrate actual time capture data which correspond to the graphs of FIGS. 17B and 17C, respectively;

FIG. 19A is a diagrammatic representation illustrating physical sector numbers and spiral numbers for spirals written in a non-sequential manner termed "Bisection Sequential 180 Degree Pairs";

FIG. 19B is a table summarizing data associated with writing spirals in the manner shown in FIG. 19A;

FIG. 19C is a graph plotting spiral number versus physical sector for spirals written in the manner shown in FIG. 19A;

FIG. 20A is a diagrammatic representation illustrating physical sector numbers and spiral numbers for spirals written in a non-sequential manner entitled "Sequential 90 Degree Quads";

FIG. 20B is a table summarizing data associated with writing spirals in the manner shown in FIG. 20A;

FIG. 20C is a graph plotting spiral number versus physical sector for spirals written in the manner shown in FIG. 20A;

FIG. 21A is a diagrammatic representation illustrating physical sector numbers and spiral numbers for spirals written in a non-sequential manner termed "Hour Glass Modulated 90 Degree Quads";

FIG. 21B is a table summarizing data associated with writing spirals in the manner shown in FIG. 21A;

FIG. 21C is a graph plotting spiral number versus physical sector for spirals written in the manner shown in FIG. 21A;

FIG. 22A is a diagrammatic representation illustrating physical sector numbers and spiral numbers for spirals written in a non-sequential manner entitled "Hour Glass Modulated 180 Degree Pairs";

FIG. 22B is a table summarizing data associated with writing spirals in the manner shown in FIG. 22A;

FIG. 22C is a graph plotting spiral number versus physical sector for spirals written in the manner shown in FIG. 22A;

FIG. 23A is a diagrammatic representation illustrating physical sector numbers and spiral numbers for spirals written in a non-sequential manner termed "Single Step Alternating Modulation";

FIG. 23B is a table summarizing data associated with writing spirals in the manner shown in FIG. 23A;

FIG. 23C is a graph plotting spiral number versus physical sector for spirals written in the manner shown in FIG. 23A;

DETAILED DESCRIPTION OF THE PREFERRED EMBODIMENT

Figure 1:
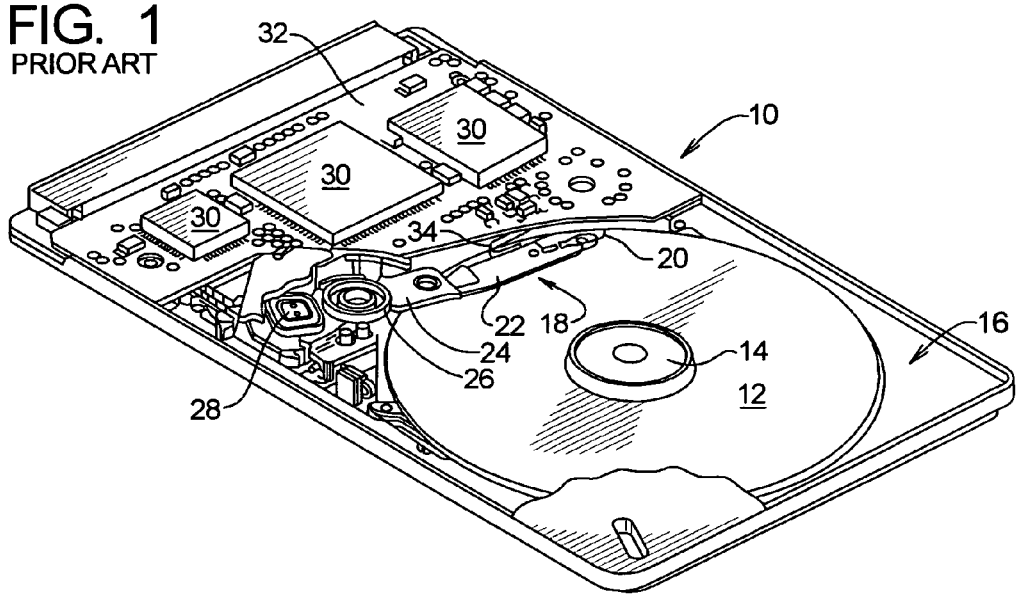
FIG. 1 is a diagrammatic representation illustrating a conventional disk drive with its top cover removed.
Figure 2:
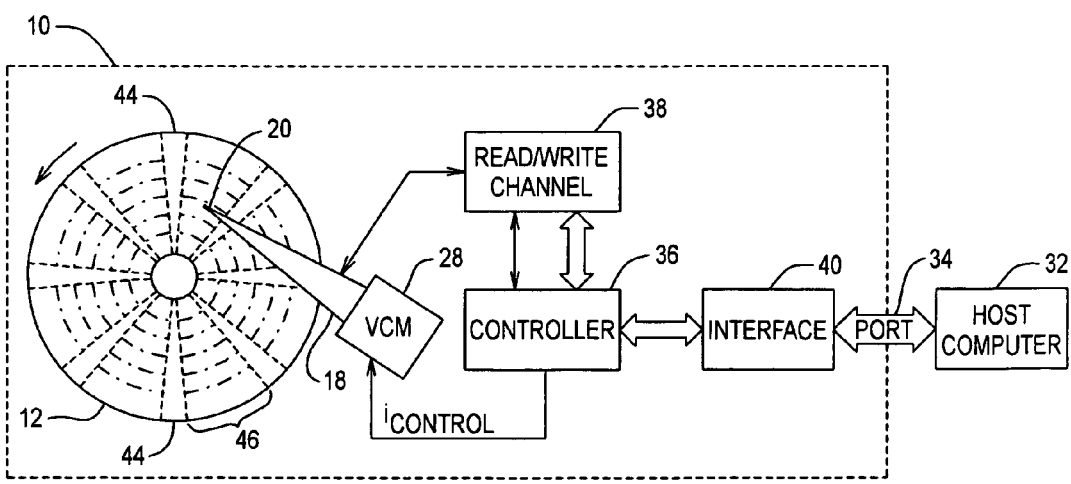
FIG. 2 is a functional block diagram which illustrates a conventional disk drive that is coupled to a host computer via an input/output port.
Figure 3:
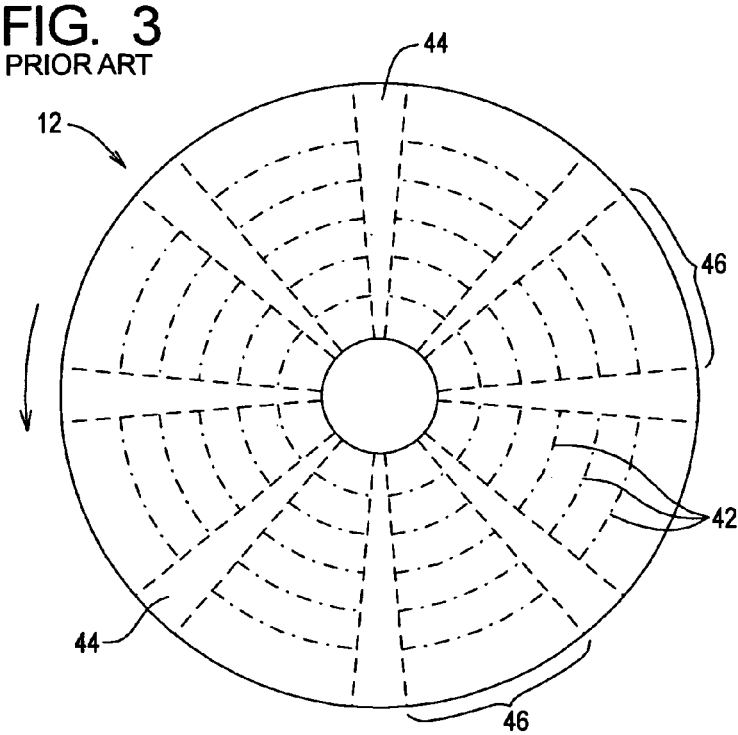
FIG. 3 is a diagrammatic representation of a top view of a magnetic storage disk illustrating a typical organization of data on the surface of a disk.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 4:
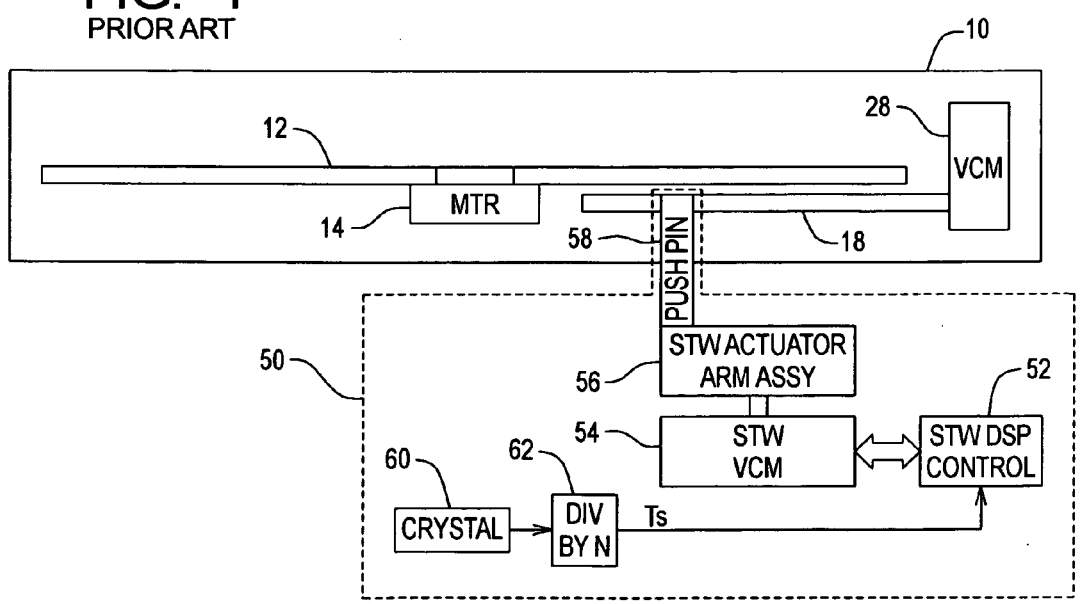
FIG. 4 is a block diagram illustrating portions of a conventional servo track writer.
Figure 5:
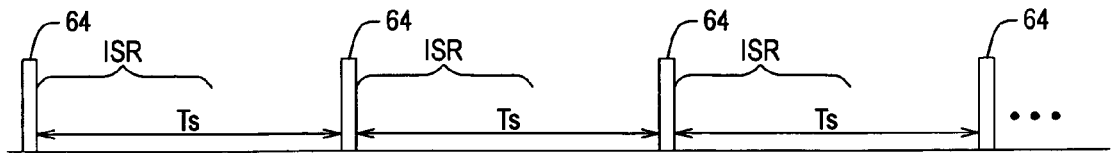
FIG. 5 is a diagrammatic representation illustrating a series of interrupt signals which occur at predetermined sample times, $T_s$.
Figure 6:
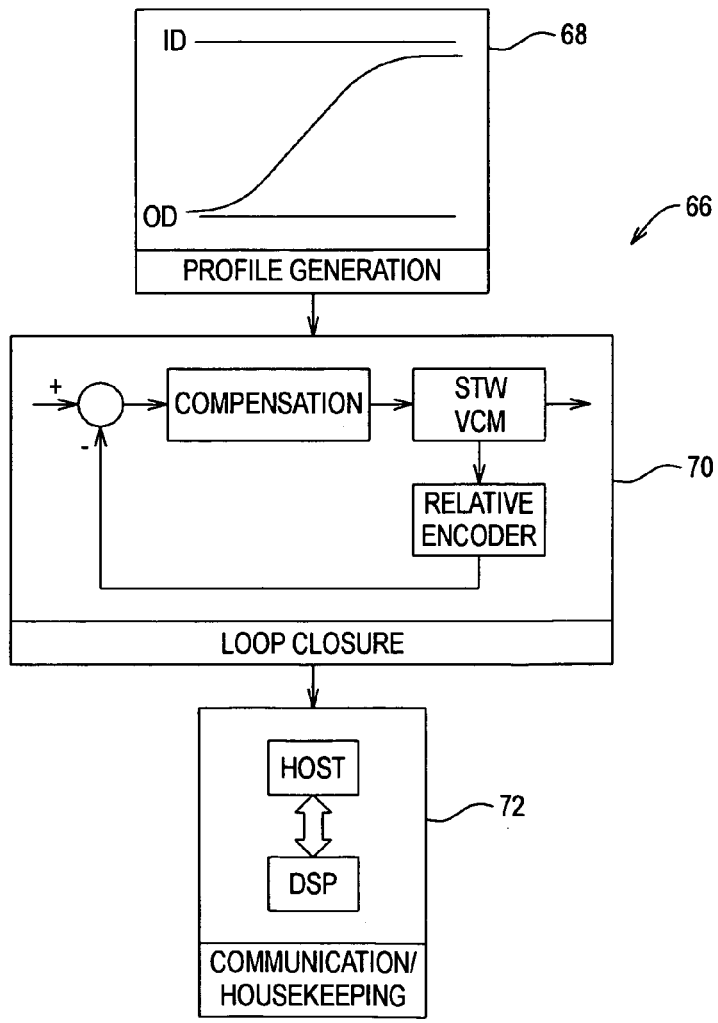
FIG. 6 is a block diagram illustrating a conventional interrupt service routine.
Figure 7:
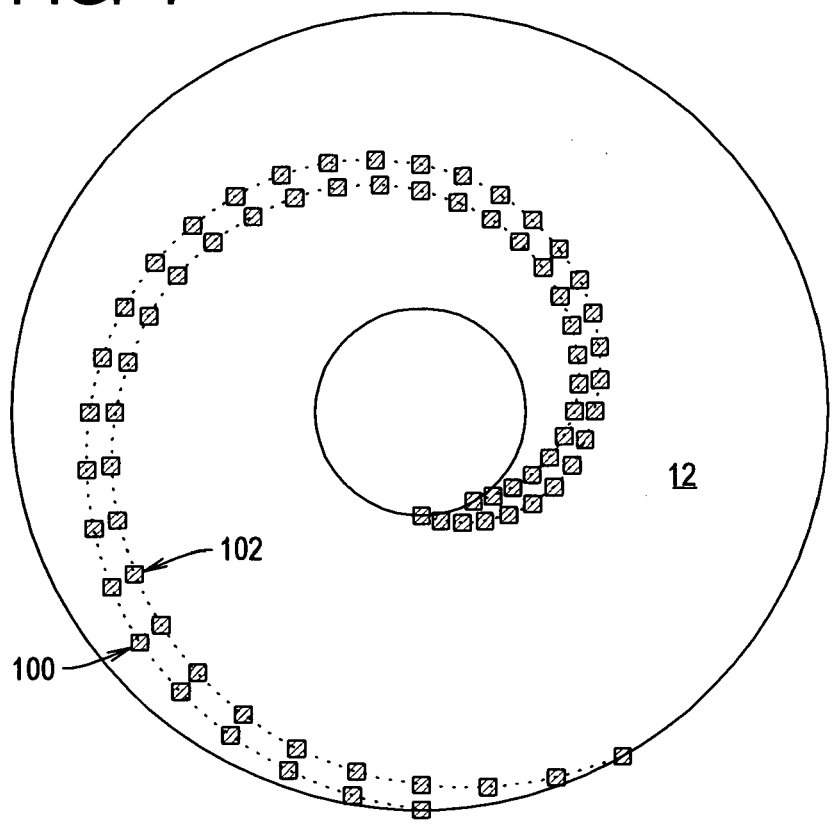
FIG. 7 is a simplified diagrammatic representation of first and second spiral patterns written onto a disk surface.
Figure 8:
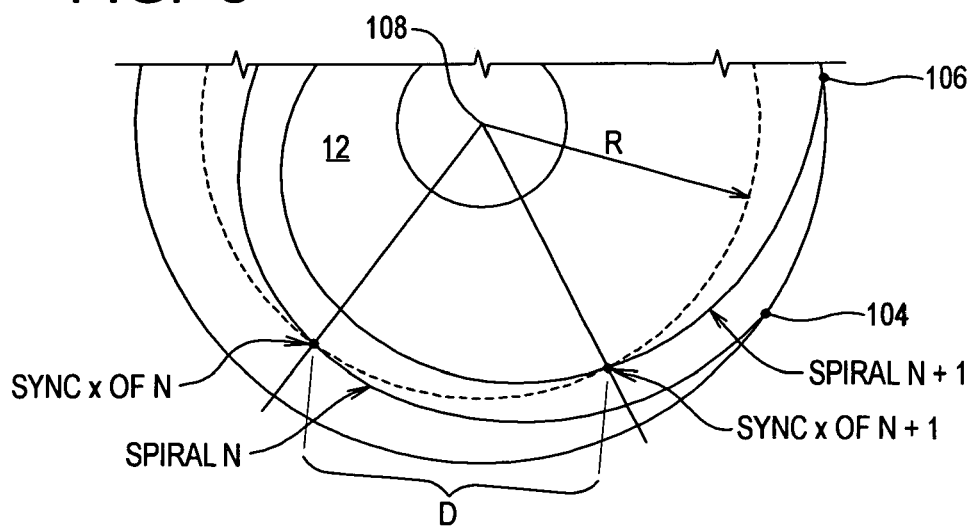
FIG. 8 is simplified diagrammatic representation of a fragmentary top view of a disk surface having two spiral patterns written thereon.
Figure 9:
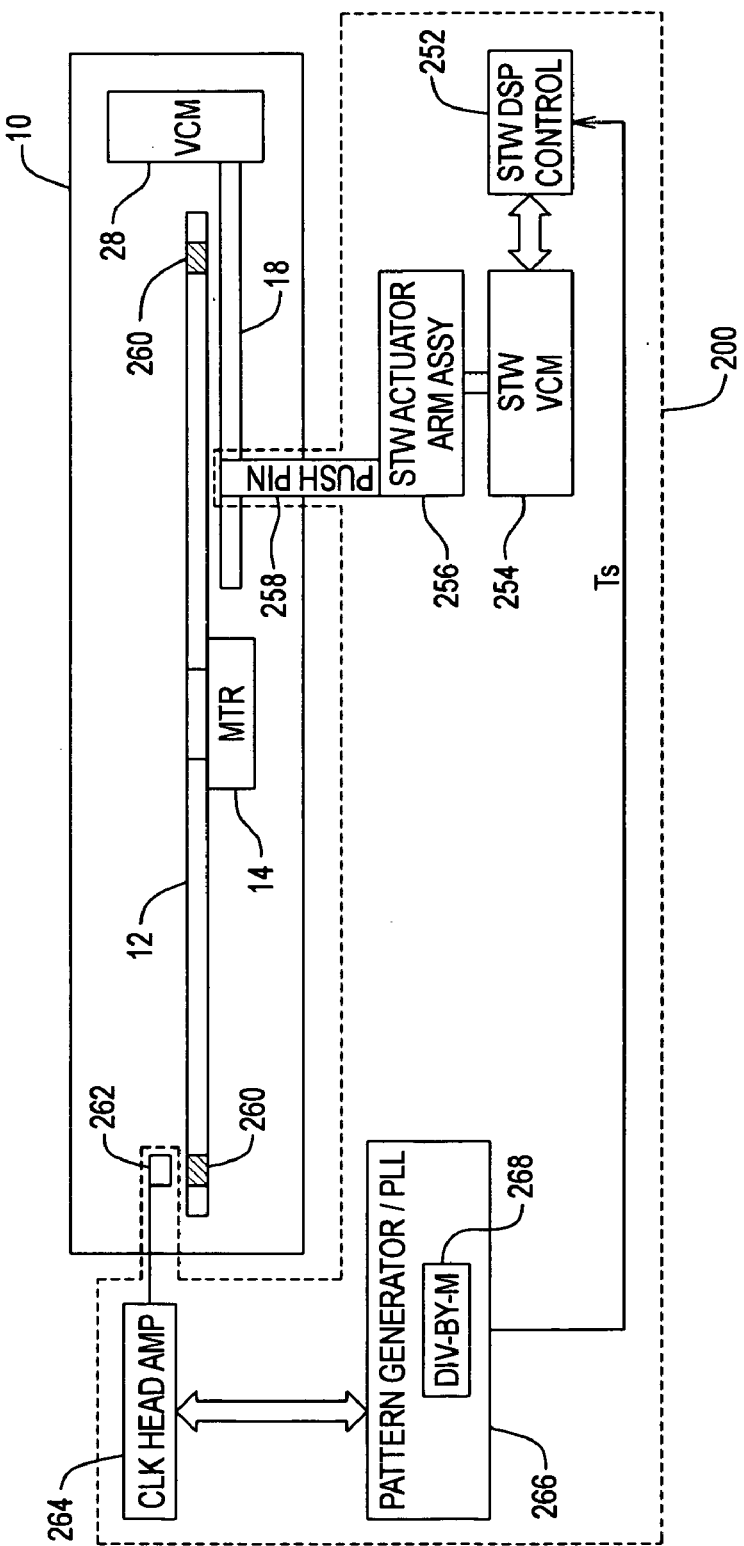
FIG. 9 is a simplified diagrammatic representation of a modified servo track writer for writing spiral servo information.

FIG. 9 is a diagrammatic representation of a modified servo track writer 200 for writing spiral servo information. Like the conventional STW shown in FIG. 4, the modified servo track writer 200 includes a STW digital signal processor (DSP) 252, a STW voice-coil motor (VCM) 254, a STW actuator arm assembly 256 and a push-pin system 258. However, in contrast to the conventional STW 50 shown in FIG. 4, the modified STW 200 uses signals read from a clock track 260 written on the disk surface 12 to provide a series of interrupt signals to the STW DSP 252.

More specifically, a clock head 262 is used to read information stored in the clock track 260 and generates an analog clock signal that is delivered to clock head amplifier 264. An amplified analog clock signal is then delivered to a pattern generator/PLL 266 to generate a digital clock signal. The pattern generator/PLL 266 preferably also includes a divide-by-M circuit 268, which is used to divide down the digital clock signal, to provide a series of interrupt signals to the STW DSP 254 at sample times, $T_s$, that are "tied" to the disk surface 12. It should be understood, however, that the divide-by-M circuit 268 could be physically separate from the pattern generator/PLL 266.

As shown in FIG. 10, the spindle speed X (in units of revolutions per minute), the interrupt rate Y (in units of seconds per interrupt) and the number of interrupts per revolution Z (in units of interrupts per revolution) are related to one another, as set forth in Equation 1. Thus, by setting any two of the parameters X, Y or Z, one can solve for the unknown parameter.

In one embodiment, the number of interrupts per revolution Z is equal to the number of servo samples per revolution (i.e., the number of spiral crossings, or sync marks, at a particular radius). It should be understood, however, that the number of servo samples per revolution divided by the number of interrupts per revolution Z can be any natural number. In general, the servo sample rate (i.e., the time between adjacent and equidistant spiral crossings, or sync marks, at a particular radius) typically should be in the 15–20 kHz range to allow for a 600–700 Hz bandwidth. Thus, for a disk surface having 160 servo samples per revolution and which is spinning at a rate of 5700 revolutions per minute, the servo sample rate will be 15.2 kHz.

FIG. 10 gives two examples of calculating one of parameters X, Y or Z given that two of the parameters are known. In both examples, the number of servo samples per revolution is equal to the number of interrupts per revolution.

In Example 1, the number of interrupts per revolution Z has been selected to be 160 and interrupt rate Y has been selected to be 68 microseconds per interrupt. In such case, by using Equation 1, the spindle speed X can be determined to be 5514.705 revolutions per minute.

In Example 2, spindle speed X has been selected to be 5700 revolutions per minute and the number of interrupts per revolution Z has been selected to be 160. In such case, by using Equation 1, the interrupt rate Y can be calculated to be 65.789 microseconds per interrupt.

As will be understood by those skilled in the art, if the filter coefficients associated with the compensator of the STW servo loop are fixed based upon a particular servo sample rate, then the sample rate may be maintained by slightly adjusting the STW write speed. However, if the write speed has been chosen and is fixed, the new filter coefficients associated with the compensator of the STW servo loop may be calculated "on the fly."

As in the case of the conventional STW 50, upon receipt of an interrupt signal, the STW DSP 252 performs an interrupt service routine (ISR). However, in contrast to the conventional STW 50, special profiles are generated in order to write spiral servo patterns. Generation of special profiles (or spiral profiles) will now be discussed.

As will be understood by those skilled in the art, in order to take advantage of the position-based interrupts, a position-type profile is implemented. Since the interrupts are "tied" to the physical disk surface by the clock PLL (i.e., digital clock signal), the profile is placed precisely relative to the disk surface 12.

Preferably, spiral patterns are written onto a disk surface by moving a transducer across the disk surface at a constant velocity (e.g., 10–20 inches per second). Furthermore, guardbands (e.g., locations where information is not stored) are provided at both the inner and outer diameters of the disk surface. Thus, a spiral profile includes a "write portion," which is based upon the total radial distance that the transducer is required to move, as well as the constant velocity and guardband requirements.

FIG. 11 is a diagrammatic representation illustrating acceleration and velocity curves along a disk surface for one embodiment of a "write portion" of a spiral profile. The "write portion" of the spiral profile shown in FIG. 11 is known as a constant accelerate "bang, coast, bang" profile. In such case, accelerate/decelerate times (i.e., the "bangs") occur as the transducer 20 moves across the guardband portions (referenced by brackets in the figure) of the disk surface 12. Preferably, the accelerate/decelerate times are as small as possible. As shown in the figure, during the coast segment of the "write portion" of the spiral profile, the transducer 20 moves at a constant velocity.

The spiral profile also includes a "post-write pad portion," which allows for a settle time after the "write portion." The spiral profile yet further includes a "re-trace portion," to specify the manner by which the transducer is to return near its starting point, so that the next spiral servo pattern may be written. Preferably, the transducer returns to its starting point as quickly as possible in a manner consistent with available maximum energy and system component characteristics. Finally, the special profile includes a "post-re-trace pad portion," which allows for a settle time after the "re-trace portion" and which allows for any special processing requirements.

Figure 12:
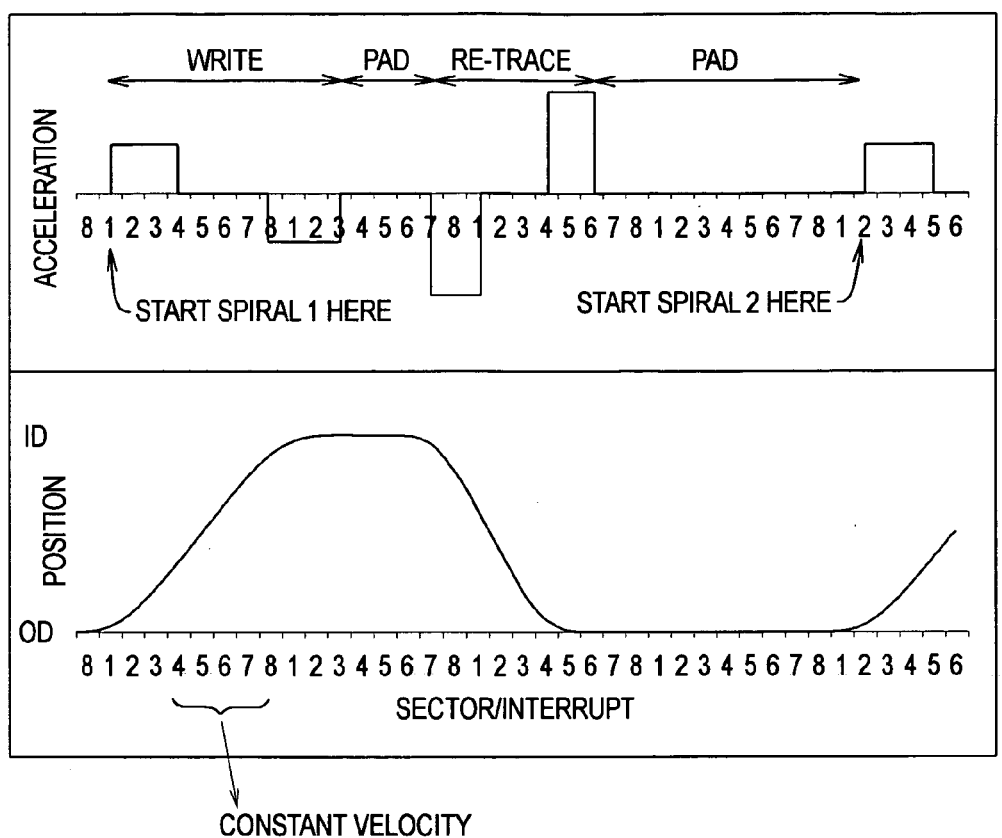
FIG. 12 is a diagrammatic representation illustrating acceleration and position curves relative to interrupts for one embodiment of a spiral profile.

FIG. 12 is a diagrammatic representation illustrating acceleration and position curves relative to interrupts for one embodiment of a spiral profile. In FIG. 12, a one-to-one relation exists between the number of interrupts and the predetermined number of servo samples. For illustrative purposes, eight spirals are to be written (i.e., there are eight servo samples per revolution and, hence, eight interrupts per revolution); however, in practice, many more spirals would be written (e.g., 160 spirals).

As shown in FIG. 12, from interrupt 1 to interrupt 4 of the first revolution, the transducer accelerates (e.g., over the guardband portion of the disk surface). Next, from interrupts 4–8 of the first revolution, the transducer moves over the disk surface at a constant velocity, so the spiral pattern is written. Subsequently, from interrupt 8 of the first revolution to interrupt 3 of the second revolution, the transducer decelerates. A pad time is provided between interrupt 3 of the second revolution to interrupt 7 of the second revolution. From interrupt 7 of the second revolution to interrupt 1 of the third revolution the transducer accelerates (in a direction opposite to the direction while writing) as part of the re-trace. From interrupt 1 to interrupt 4 of the third revolution, the transducer moves at a constant velocity. From interrupt 4 to interrupt 6 of the third revolution, the transducer decelerates (again, in a direction opposite to the direction while writing). A pad time is then provided from interrupt 6 of the third revolution for a period of 12 interrupts, so that the next spiral may be written beginning at interrupt 2 of revolution 5. This process repeats until all 8 spirals have been written.

It should be noted that, instead of generating a single spiral profile that includes a "write portion," "post-write pad portion," "re-trace portion" and "post-re-trace pad portion," one or more of the aforementioned portions may be considered to be separate profiles that are performed sequentially. However, the single profile approach is preferred. If no post spiral write processing is required, the single profile may be cycled repeatedly until all spirals are written (e.g., as in FIG. 12).

Figure 13:
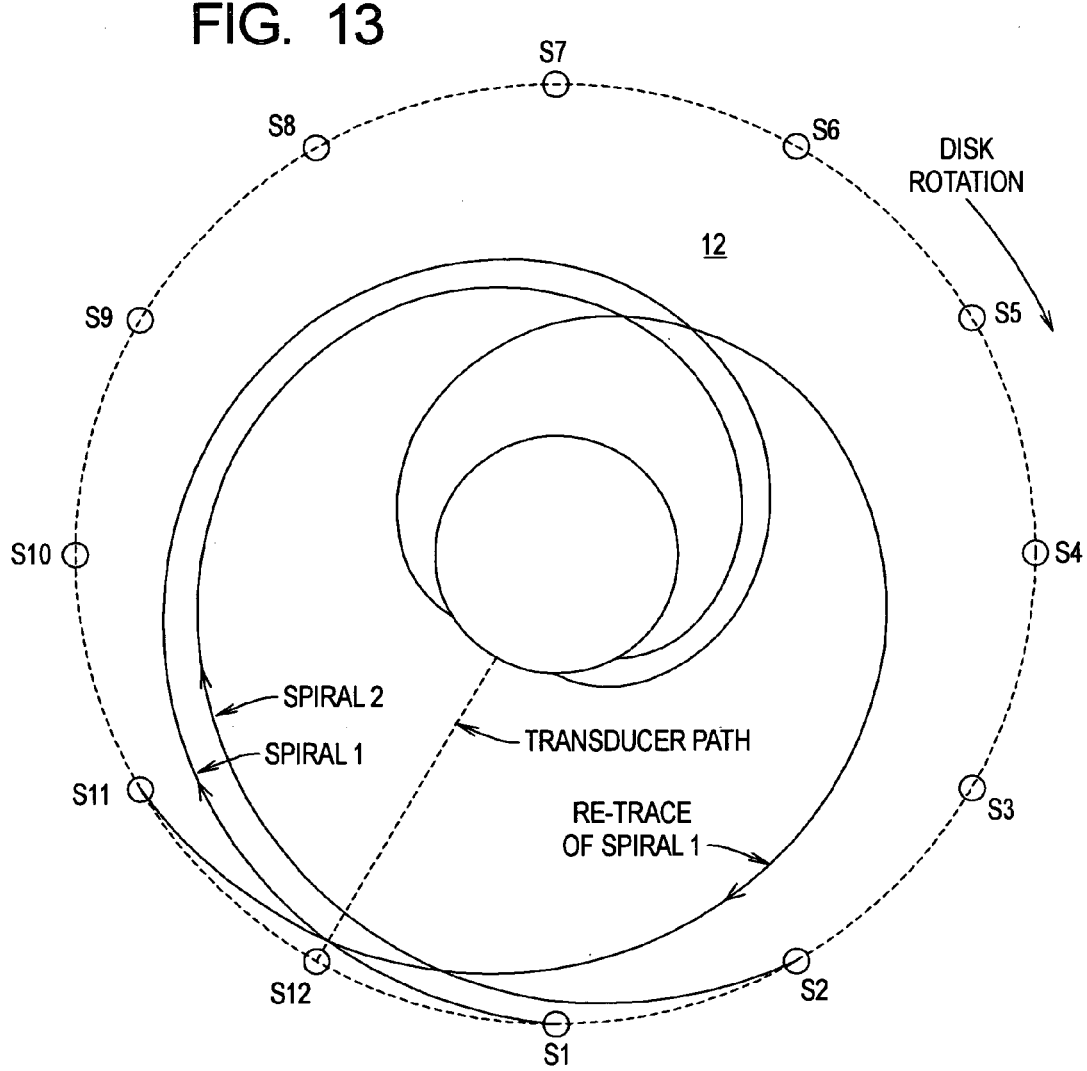
FIG. 13 is a simplified diagrammatic representation of a top view of a disk surface which illustrates a sequential manner of writing spirals of servo information on a disk surface.

FIG. 13 is a simplified diagrammatic representation of a top view of a disk surface which illustrates a sequential manner of writing spirals of servo information on a disk surface. For sake of clarity, in FIG. 13, twelve spirals are to be written, although many more spirals are written in practice.

In FIG. 13, by following a "write, post-write pad, re-trace, post-re-trace pad" profile (for example), a transducer begins writing spiral 1 at the predetermined position of servo sample 1 and, after a post-write pad time and re-trace, the transducer will be located at the predetermined position of servo sample 11. Presuming a one-to-one correlation exists between the number of servo sectors and the number of interrupts, spiral 2 would be written after waiting for the occurrence of three interrupts (e.g., during the post-re-trace pad). (It should be noted that, in practice, a longer duration than three interrupts may be required.) The process would repeat until all twelve of the spirals were written.

Although the spirals have been described as being written from an outer diameter to the inner diameter, it should be understood that the spirals may be written from the inner diameter to the outer diameter. Furthermore, it should be understood that a sequential manner of writing spirals is not necessary. Instead, the spirals may be written in any order and, in an extreme opposite case to the sequential manner of writing spirals, the spirals may be written in a random order.

In the case of writing spirals in a sequential manner, in one embodiment, the entire profile (e.g., "write, post-write pad, re-trace, post re-trace pad") should be equal to the predetermined total number of spiral sectors per revolution plus one. Thus, when the cycle repeats, the next spiral will begin at exactly the next predetermined servo sector location relative to the immediately previously written spiral. Accordingly, once this algorithm is started, all spirals will be written sequentially from start to finish. (It should be understood that many other algorithms are possible.)

If, for example, the entire profile doesn't equal an integer number of servo sectors per revolution plus 1, it is a relatively simple matter to wait for the appropriate physical disk location by keeping track of the number of interrupts that have occurred since the spiral writing process began.

Figure 14:
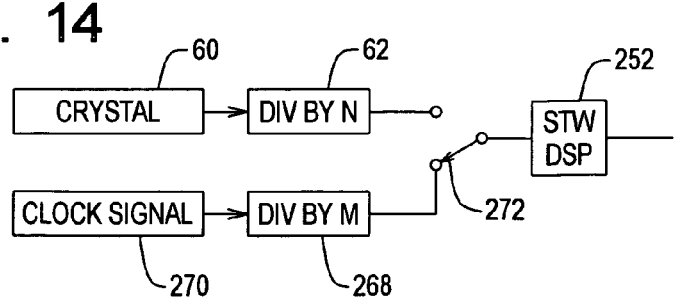
FIG. 14 is a simplified block diagram illustrating a switch, which permits a STW DSP to receive interrupts based upon a clock signal while writing spirals of servo information and to receive conventional fixed interrupts based upon a signal from a crystal during other operations.

It should be understood that, after the spirals of servo information have been written, it is no longer necessary to be locked to the clock. FIG. 14 is a simplified block diagram illustrating a switch 272, which permits the STW DSP 252 to receive interrupts based upon a clock signal 270 while writing spirals of servo information and to receive conventional fixed interrupts based upon a signal from the crystal 60 during other operations.

The inventors of the present invention have determined that certain thermal and/or mechanical changes may occur between the time first spiral is written and the time the last spiral is written. These thermal and/or mechanical changes may cause discontinuities to exist between certain spirals. That is, instead of all of the spirals being near equally-spaced relative to one another about the disk surface, certain spirals may be spaced farther apart than most other spirals. Furthermore, the inventors of the present invention have also determined that it would be beneficial to be able to either reduce such discontinuities or predict such discontinuities, so that the disk drive's servo system may compensate for the discontinuities.

The thermal changes and/or mechanical changes may occur for many reasons. One reason for the thermal and/or mechanical changes may be due to the energy used to write the spirals. As mentioned above, for example, spirals may be written by dynamically moving the transducer across the disk surface at 10 or 20 inches per second. Since a disk used for a 3±2 inch hard disk drive typically has approximately 1 inch of writable distance (when measured along a radius) from its outer diameter to its inner diameter, each spiral is written in approximately 0.1 seconds. After the spiral is written, a retrace sequence ensues, whereby the transducer is moved to a location at which the next spiral will be started. These abrupt movements may contribute to certain thermal and/or mechanical changes.

The thermal and/or mechanical changes may include, for example, disk growth, growth in the length of the disk drive's actuator arm assembly, growth in the width of the disk drive's actuator arm assembly, movement of the disk drive relative to the servo track writer, movement between the disk drive and the clock head, shift in the clock head, drift in the clock's voltage controlled oscillator, servo track writer c-station movement, growth in mechanical linkages between servo track writer and disk drive, and changes in the push-pin connecting the servo track writer and the disk drive, among other things. The thermal and/or mechanical changes are directly related to the length of time it takes to write the spirals.

The thermal and/or mechanical changes may cause spacing errors between adjacent spirals, as well as closure errors (akin to closure errors in a clock track) when, for example, the first written spiral is adjacent to the last written spiral. Accordingly, the inventors of the present invention have determined that the order in which spirals are written is important in being able to reduce closure errors and/or to predict discontinuities.

In order to more clearly understand the problem, reference is made to FIG. 15A, which illustrates physical sector numbers on a disk surface and spiral numbers (indicating the order in which each of the spirals was written). For purposes of illustration, it is assumed that only 12 spirals are written and that the spirals are written from OD to ID. In practice, many more spirals would be written and the spirals might be written from ID to OD (or in some other fashion).

As shown in FIG. 15A, the 12 spirals were written sequentially. That is, spiral number 1 was written beginning at physical sector number 1. Then, spiral 2 was written beginning at physical sector 2, and so on.

Because it is believed that spirals that are written further apart in time will experience larger thermal and/or mechanical changes, a comparison is made between the local timing differences between adjacent spirals. For example, as shown in FIG. 15B, a comparison is made between the time of writing the spiral at physical sector number 2 relative to physical sector 1, and between the time of writing the spiral at physical sector number 3 relative to physical sector 2, and so on. The difference is represented as local delta in FIG. 15B.

As shown in FIG. 15B, the local delta between adjacent spirals is 1 for all spirals, except between the last-written spiral and the first-written spiral (i.e., between physical sector number 1 and physical sector number 12) where the local delta is 11. Other data, such as the minimum delta, maximum delta, average delta, median delta, standard deviation of delta, and variance for delta, is also shown in FIG. 15B.

As shown in FIG. 15C, spiral number is plotted relative to physical sector number for sequentially written spirals. As shown in FIG. 15C, a large discontinuity is shown between the last written spiral (spiral 12) and the first written spiral (spiral 1). This is due to the large time difference between writing the first spiral (spiral 1) and writing the last spiral (spiral 12) as described in connection with FIGS. 15A and 15B.

Figure 16:
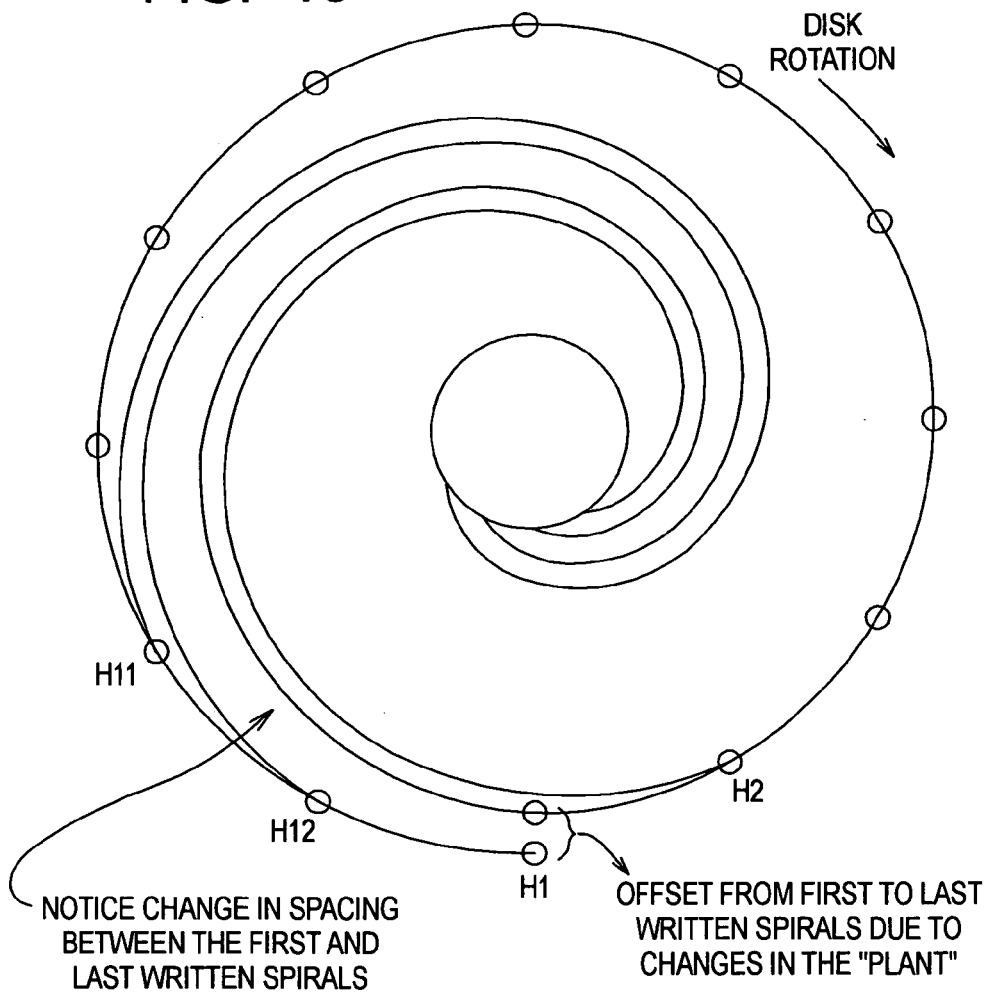
FIG. 16 is a simplified diagrammatic representation illustrating a discontinuity between a first-written spiral and a last-written spiral for spirals that have been written sequentially when thermal and/or mechanical changes have occurred.

FIG. 16 also illustrates a discontinuity between a first-written spiral and a last-written spiral for spirals that are written sequentially when there are thermal and/or mechanical changes in the plant (i.e., mechanics of the disk drive, push-pin system and STW coupled en total). The plant changes, for example, could be a lengthening of the actuator arm or an increase in the radius of the underlying position encoder.

FIG. 17A illustrates a measurement technique that may be used to determine the local errors (delta time in FIG. 17A) and accumulated errors (running time). In FIG. 17A, the diamonds represent information that would be read when a read head crossed a spiral. The ideal time represents ideal spiral-center times. Actual time represents actual spiral-center times.

Figure 17B:
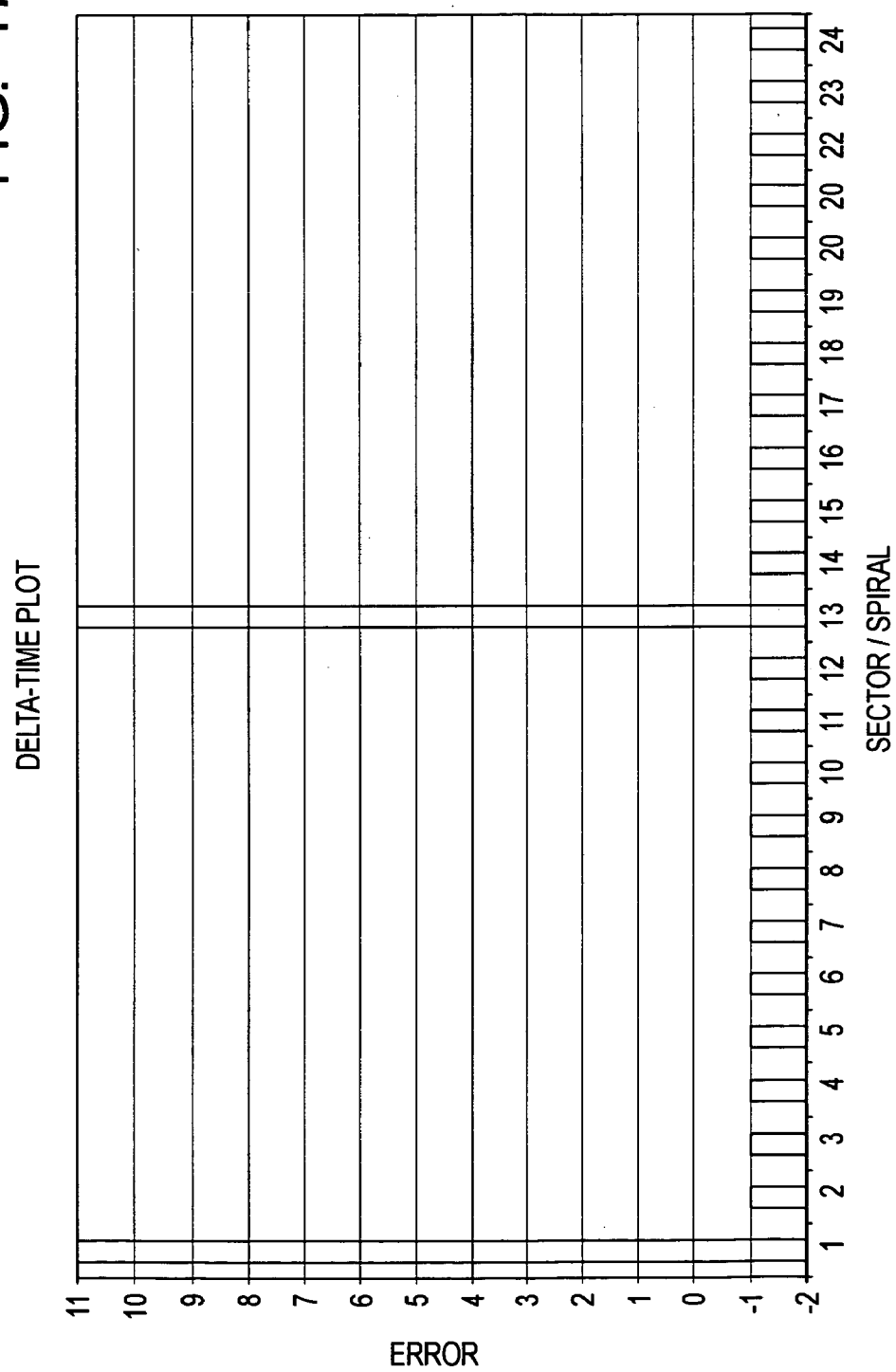
FIG. 17B is a graph illustrating local errors associated with certain physical sector locations for spirals that have been written sequentially.

FIG. 17B illustrates a delta time plot, while FIG. 17C illustrates a running time plot. The data used to develop the plots in FIGS. 17B and 17C is set forth in FIG. 17D. Specifically, as shown in FIG. 17D, fictitious spirals are consistently placed 69 μs apart, as compared to an ideal 70 μs placement.

Figure 18A:
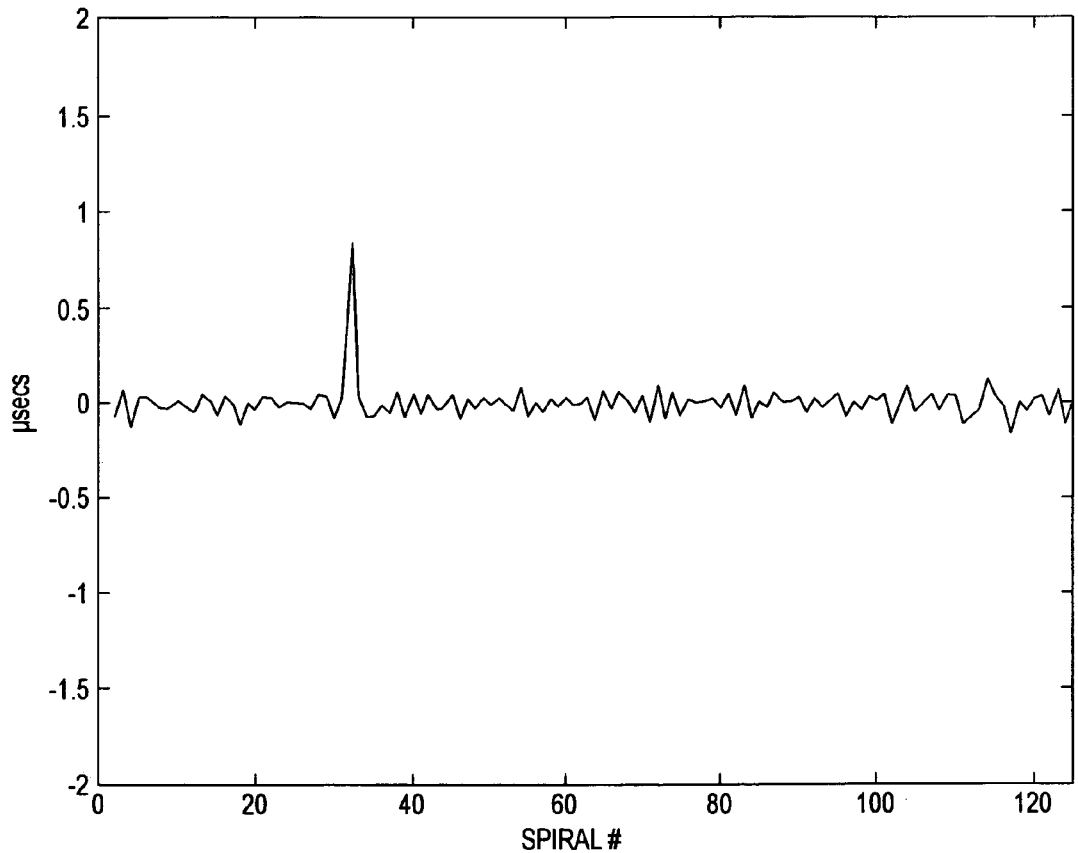

FIGS. 18A and 18B provide actual time capture data for 120 sequentially-written spirals. FIG. 18A corresponds to the delta time plot of FIG. 17B, while FIG. 18B corresponds to the running time plot of FIG. 17C. It should be noted that the data in FIGS. 18A and 18B was arbitrarily collected. That is, spiral number 1 (along the x-axis of FIG. 18A) does not correspond to physical sector 1. Instead, physical sector 1 would approximately correspond with spiral number 30 in both FIGS. 18A and 18B. The actual data in FIGS. 18A and 18B is remarkably similar to the predicted shape of FIGS. 17B and 17C, respectively.

FIG. 19A illustrates another order of writing spirals onto a disk surface. The technique is termed "Bisection Sequential 180 Degree Pairs." Corresponding odd and even spirals are written 180 degrees apart from one another in a sequential manner about the disk. An example is shown in FIG. 19A for 12 spirals and 12 physical sector numbers.

As shown in FIG. 19B, the minimum local delta between adjacent spirals is 2 and the maximum local delta is 11. Accordingly, the technique shown in FIG. 19A produces a pattern similar to the sequential technique of FIG. 15A, but with a 2f fundamental. This is shown in FIG. 19C.

As shown in FIG. 19C, spiral number is plotted relative to physical sector number. As shown in FIG. 19C, two large discontinuities are shown. One large discontinuity is between the last written spiral (spiral 12) and the first written spiral (spiral 1), while the other large discontinuity is between spiral 2 and spiral 11 (i.e., physical sector number 7 and physical sector number 6).

FIG. 20A illustrates another order of writing spirals onto a disk surface. The technique is termed "Sequential 90 Degree Quads." Groups of four spirals are written 90 degrees apart from one another in a sequential manner about the disk. An example is shown in FIG. 20A for 12 spirals and 12 physical sector numbers.

As shown in FIG. 20B, the minimum local delta between adjacent spirals is 4 and the maximum local delta is 11. Accordingly, this technique produces a 4f fundamental. This is shown in FIG. 20C.

As shown in FIG. 20C, spiral number is plotted relative to physical sector number. As shown in FIG. 20C, one large discontinuity is shown between the last written spiral (spiral 12) and the first written spiral (spiral 1). Three relatively smaller discontinuities are shown between physical sector 4 and physical sector 3; physical sector 7 and physical sector 6; and, physical sector 10 and physical sector 9, respectively.

FIG. 21A illustrates yet another order of writing spirals onto a disk surface. The technique is termed "Hour Glass Modulated 90 Degree Quads." Groups of four spirals are written 90 degrees apart from one another and are written in a modulated manner about the starting locations. An example is shown in FIG. 21A for 12 spirals and 12 physical sector numbers.

As shown in FIG. 21B, the minimum local delta between adjacent spirals is 1 and the maximum local delta is 8. Accordingly, this technique produces a 4f fundamental. This is shown in FIG. 21C.

As shown in FIG. 21C, spiral number is plotted relative to physical sector number. As shown in FIG. 21C, four relatively large discontinuities are shown between physical sector 4 and physical sector 3; physical sector 7 and physical sector 6; physical sector 10 and physical sector 9; and, physical sector 1 and physical sector 12, respectively.

FIG. 22A illustrates yet another order of writing spirals onto a disk surface. The technique is termed "Hour Glass Modulated 180 Degree Pairs." Pairs of spirals 180 degrees apart are written in a modulated manner about the starting locations. An example is shown in FIG. 22A for 12 spirals and 12 physical sector numbers.

As shown in FIG. 22B, the minimum local delta between adjacent spirals is 1 and the maximum local delta is only 4. In fact, the average local delta is 3.33 and there is no drastic closure problem between the last written spiral and the first written spiral. This technique produces a 2f fundamental. This is shown in FIG. 22C.

Figure 22D:
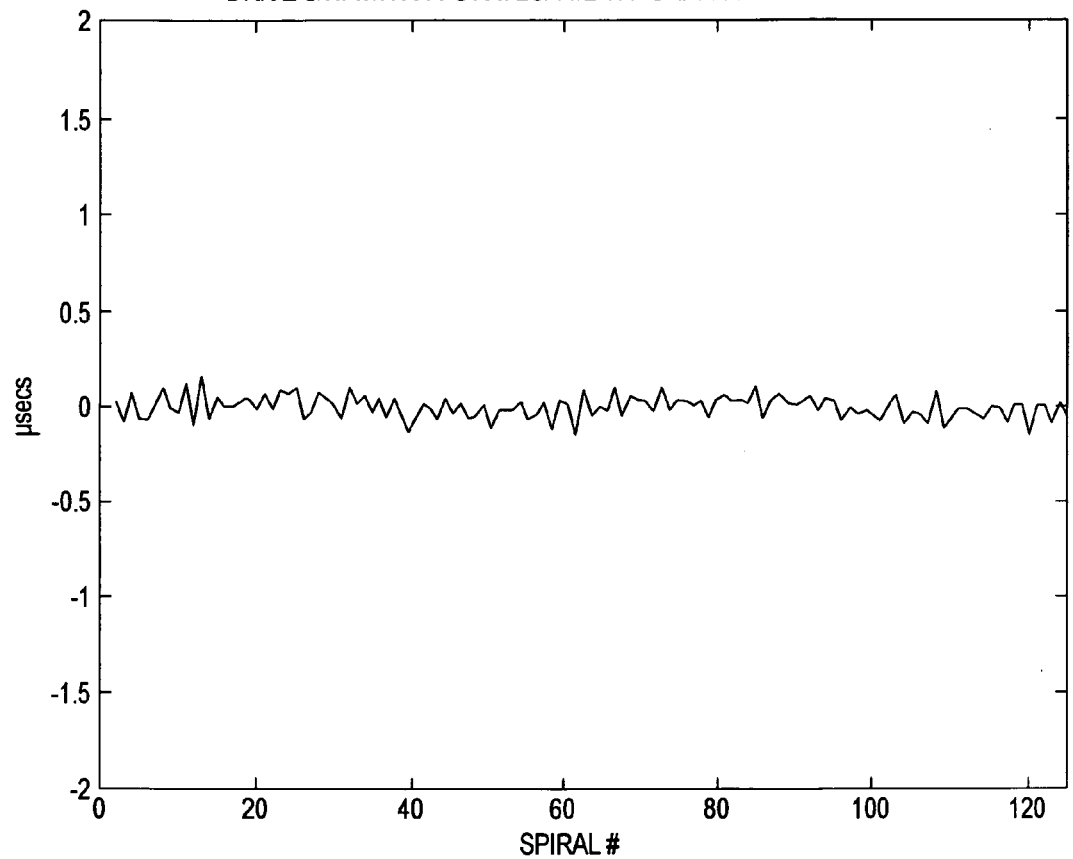
FIGS. 22D and 22E illustrate actual time capture data for spirals written in the manner shown in FIG. 22A, wherein such figures correspond to the graphs of FIGS. 18A and 18B, respectively.
Figure 22E:
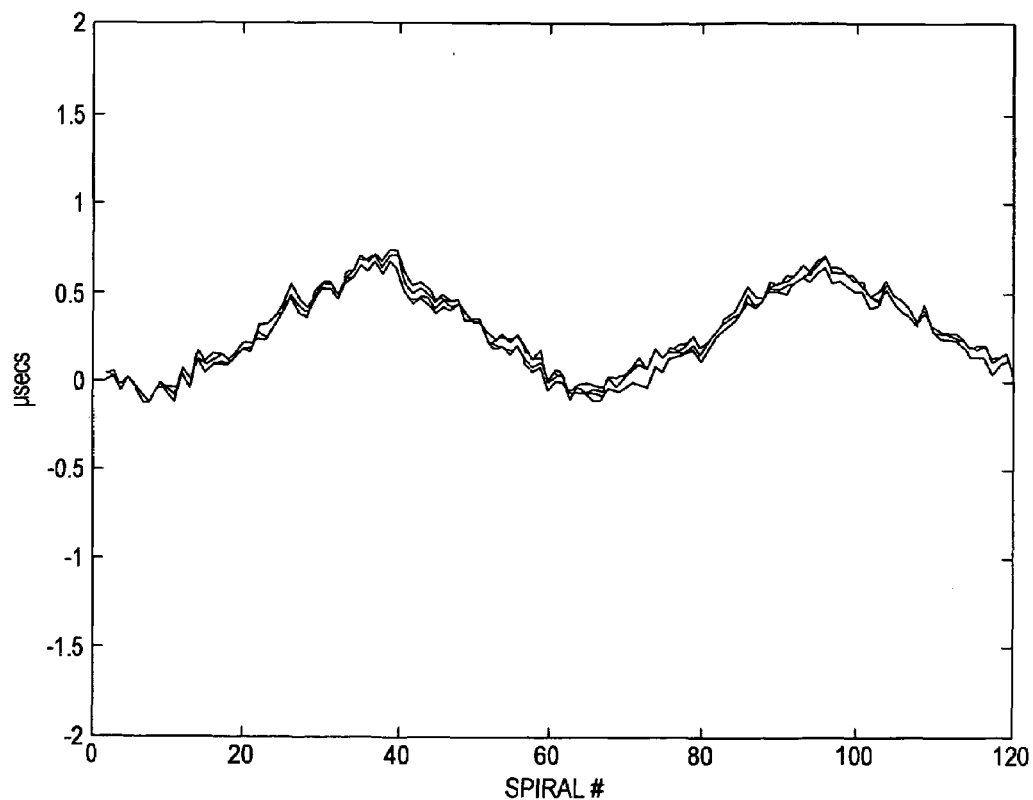

FIGS. 22D and 22E are actual time capture data for a disk having 120 servo sectors and 120 written spirals. FIG. 22D represents a delta time plot, while FIG. 22E represents a running time plot (accumulated error). Again, the data in FIGS. 22D and 22E was collected in an arbitrary manner (like FIGS. 18A and 18B). A remarkable similarity exists between FIG. 22E and the predicted shape in FIG. 22C.

FIG. 23A illustrates yet a further order of writing spirals onto a disk surface. The technique is termed "Single Step Alternating Modulation." Spirals are written in an alternating manner in about the starting location, where a next spiral is written adjacent to a prior spiral on the same "side" of the starting location. An example is shown in FIG. 23A for 12 spirals and 12 physical sector numbers.

As shown in FIG. 23B, the minimum local delta between adjacent spirals is 1 and the maximum local delta is only 2. In fact, the average local delta is 1.833 and there is no drastic closure problem between the last written spiral and the first written spiral. This technique produces a very gentle 1f frequency component. This is shown in FIG. 23C.

Figure 23D:
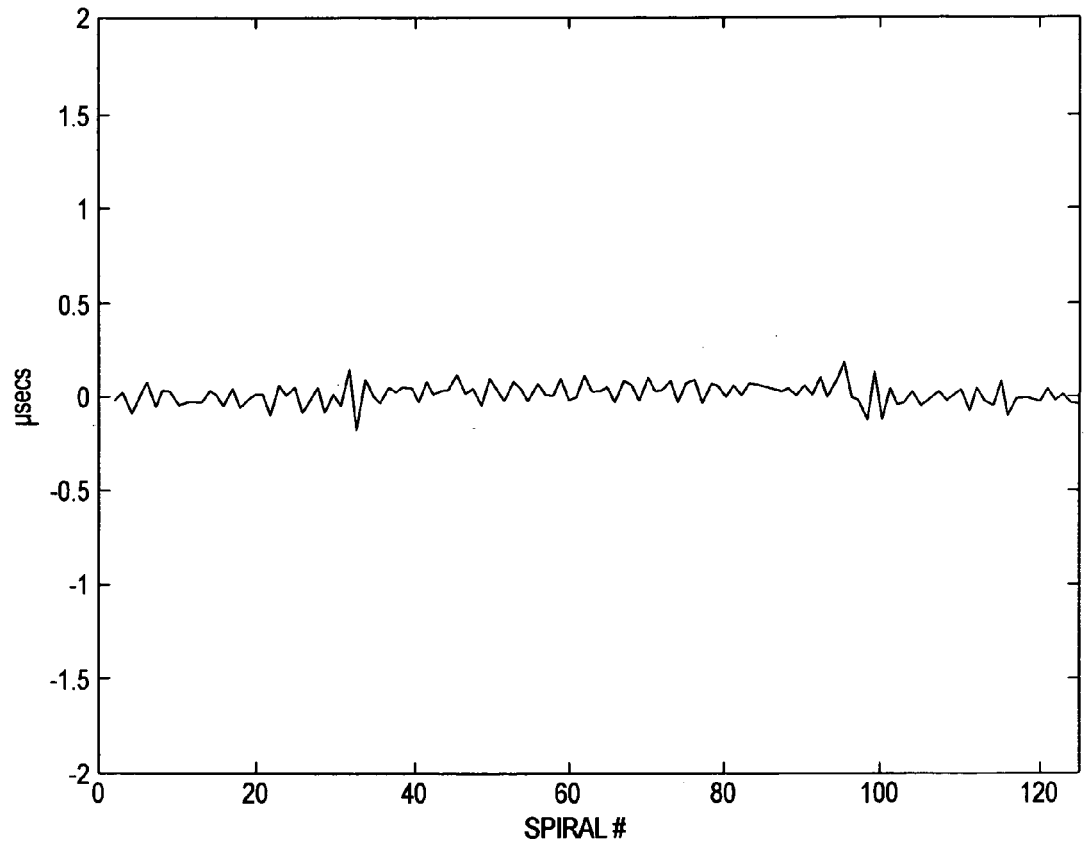
FIGS. 23D and 23E illustrate actual time capture data for spirals written in the manner shown in FIG. 23A, wherein such figures correspond to the graphs of FIGS. 18A and 18B, respectively.
Figure 23E:
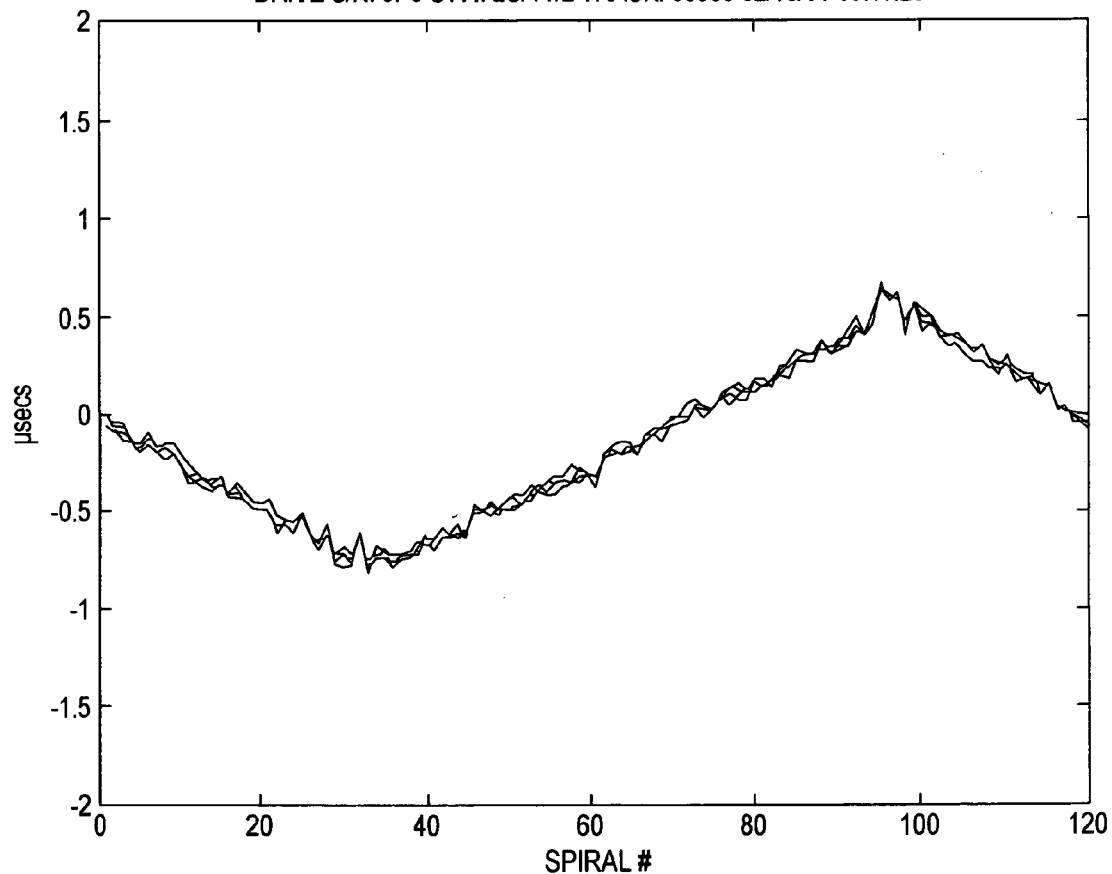

FIGS. 23D and 23E show actual time capture data for a disk having 120 servo sectors and 120 written spirals. FIG. 23D represents a delta time plot, while FIG. 23E represents a running time plot (accumulated error). Again, a remarkable similarity exists between FIG. 23E and the predicted shape in FIG. 23C.

Of the techniques described for prescribing the order in which spirals are written, it appears that the two best are the "Hour Glass Modulated 180 Degree Pairs" and the "Single Step Alternating Modulation," since both techniques do not exhibit very large discontinuities between adjacent spirals. It should be noted, however, that one or more of the other techniques described herein may also be useful depending upon the disk drive's ability to "correct" for spiral placement errors (e.g., with its embedded runout correction algorithms), as will be understood by those skilled in the art. For example, a disk drive might be more adept at correcting 1f runout errors instead of 2f runout errors, which might make one of the techniques more suitable than the others.

The inventors have determined that a thermal warm-up regimen can be used to reduce some of the affects associated with timing differences between writing adjacent spirals. This thermal warm-up regimen can be used regardless of the order in which the spirals will ultimately be written.

Figure 24:
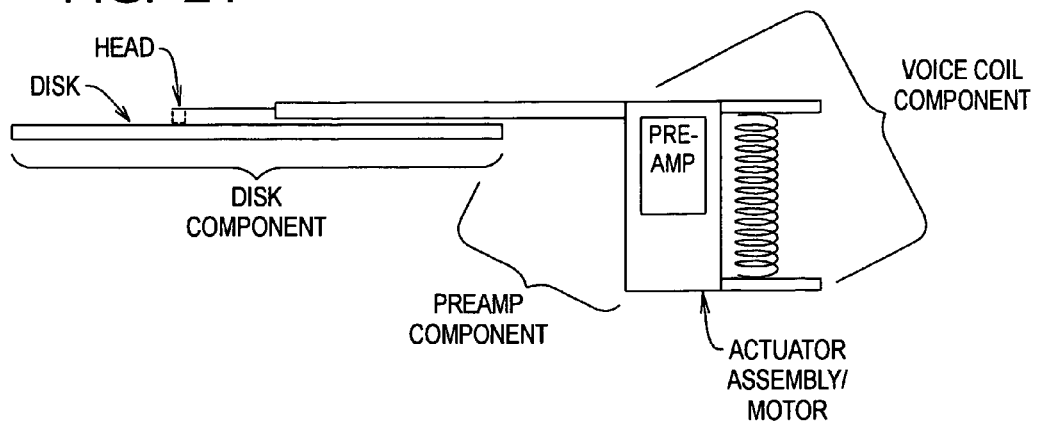
FIG. 24 is a simplified diagrammatic representation illustrating components that are affected by thermal and/or mechanical changes.

With reference to FIG. 24, the inventors have observed that there are three main components in writing spirals that are affected by thermal and/or mechanical changes. First, there is a disk component, which includes the disk and the head (transducer). Second, there is a voice coil component, which includes the voice coil motor and the actuator arm assembly. Third, there is a pre-amplifier component, which includes the pre-amplifier.

Specifically, the thermal warm-up regimen involves performing a full spiral pack write without actually placing any patterns on the disk. By doing so, the voice coil is preheated. Furthermore, the actuator arm assembly associated with each disk surface also is preheated. Even further, the disk is also preheated and, consequently, may expand. Immediately following the thermal warm-up regimen, the spirals are written. For example, for a disk having 120 spirals to be written thereon, 120 "fake" spirals are "written." Then, 120 actual spirals are written. Experiments have shown a significant reduction in peak-to-peak timing error using the above-described warm-up regimen.

In another embodiment, the thermal warm-up regimen can include a pre-amplifier warm-up, whereby write gate is turned on, but no data is written (i.e., a DC erase is performed) when "writing" the "fake" spirals. Experiments relating to the pre-amplifier warm-up have also shown a reduction in peak-to-peak timing error.

Figure 25:
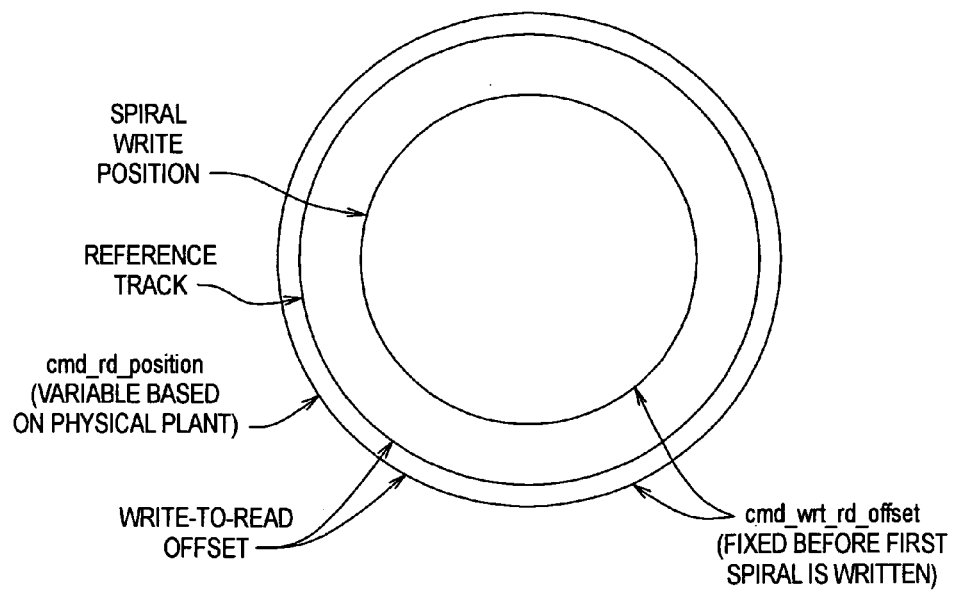
FIG. 25 is a simplified diagrammatic representation of a top view of a disk surface which illustrates a reference track that is used to account for thermal and/or mechanical changes when writing spirals; and, FIG. 26 is a block diagram illustrating a method for accounting for thermal and/or mechanical changes when writing spirals.
Figure 26:
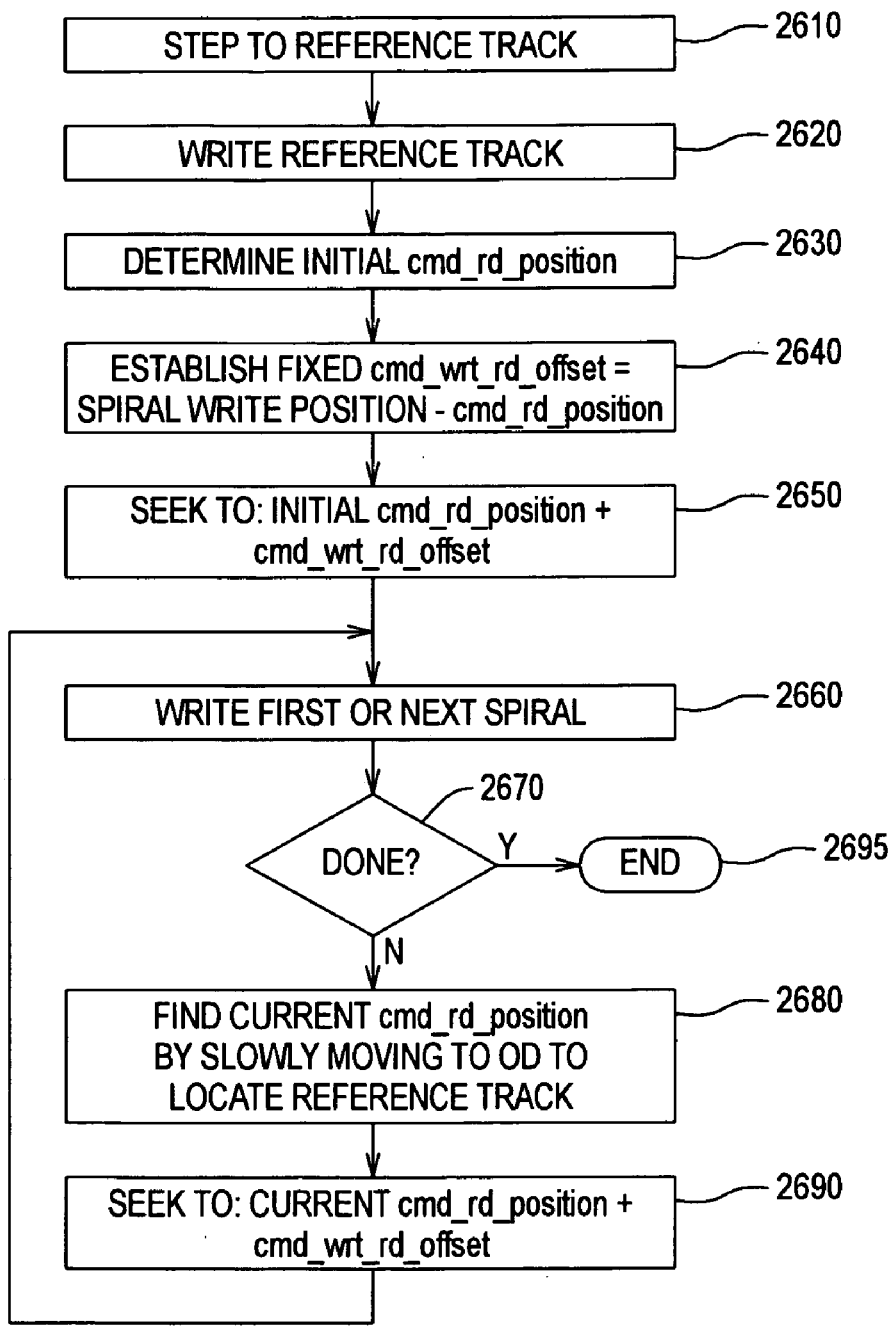

In another embodiment, which is described in connection with FIGS. 25 and 26, a reference track is used to account for certain thermal and/or mechanical changes associated with writing spirals. With reference to FIGS. 25 and 26, a STW is used to step to a reference track location near the OD (for example) of the disk (step 2610). A reference track is written using the disk drive's write head (step 2620). The reference track is a test pattern (e.g., a 1f or 2f pattern) that can be easily identified.

An initial command read position (cmd_rd_position) is determined to correlate the reference track location with the STW's external positioning system (step 2630). It should be noted that there is a write-to-read offset between the write head and the read head of the disk drive's transducer, which must be taken into account (as will be understood by those skilled in the art). The command read position may, for example, be at arbitrary position 0 relative to the STW's external positioning system.

A fixed command write-to-read offset is established (step 2640). This may be predetermined in firmware or software, or may be programmable. The fixed command write-to-read offset reflects a distance in arbitrary units (e.g., laser counts) between a spiral write position determined using the STW's positioning system and the command read position relative to the STW's external positioning system (position 0 in this example). For example, the fixed command write-to-read offset may be 100 laser counts.

In step 2650, using the STW's external positioning system, the disk drive's transducer is moved into position for writing a first spiral. For example, the STW's external positioning system moves the disk drive's transducer from position 0 (the command read position) plus 100 laser counts.

In step 2660, the first spiral or next spiral is written. Then, a determination is made as to whether the last spiral has been written (step 2670).

If the last spiral has not been written, the disk drive's transducer is stepped towards the reference track (towards the OD, in this example) and the disk drive's transducer head is used to read/find the reference track. Using the reference track, the current command read position is determined and is correlated to the STW's positioning system (step 2680). If thermal and/or mechanical changes have occurred, the current command read position may be different from the initial command read position. For example, the command read position may be 3 laser counts towards the ID from the original command read position relative to the STW's positioning system.

In step 2690, using the STW's external positioning system, the disk drive's transducer is moved into position for writing a next spiral. For example, the STW's external positioning system moves the disk drive's transducer from position 3 (the current command read position) plus 100 laser counts to position 103. Accordingly, writing of the next spiral will start at a position relative to the "changed" position of the reference track to account for some or all of the thermal and/or mechanical changes.

In step 2660, the next spiral is written. In step 2670, a determination is made as to whether the last spiral has been written. If it has, the process terminates in step 2695.

It is believed that discontinuities between the first written spiral and the last written spiral may be reduced using the above-described reference track technique. Furthermore, it is also believed that spiral-to-spiral shifts between adjacent spirals may also be reduced.

It should be understood that the present invention is not limited to writing spiral servo patterns using the embodiments of the modified STW described herein. Instead, the principles of the present invention may be applied anytime spiral patterns are written to a disk surface, whether such patterns are written using a STW or otherwise (e.g., using the product head).

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
    providing a disk surface; and,
    writing spirals of servo information onto a disk surface in a non-sequential manner, wherein a first spiral of servo information is completely written before writing a second spiral of servo information.

2. The method of claim 1, wherein the spirals of servo information are written using a servo track writer.

3. The method of claim 1, wherein the spirals of servo information are written according to a Bisection 180 Degree Pairs technique.

4. The method of claim 1, wherein the spirals of servo information are written according to a Sequential 90 Degree Quads technique.

5. The method of claim 1, wherein the spirals of servo information are written according to an Hour Glass Modulated 90 Degree Quads technique.

6. The method of claim 1, wherein the spirals of servo information are written according to an Hour Glass Modulated 180 Degree Pairs technique.

7. The method of claim 1, wherein the spirals of servo information are written according to a Single Step Alternating Modulation technique.

8. The method of claim 1, wherein no more than three spirals of servo information are written between the time of writing a spiral of servo information and an adjacent spiral of servo information, for all spirals of servo information written onto the disk surface.

9. The method of claim 1, wherein no more than two spirals of servo information are written between the time of writing a spiral of servo information and an adjacent spiral of servo information, for all spirals of servo information written onto the disk surface.

10. The method of claim 1, wherein a thermal warm-up regimen is performed prior to writing the spirals of servo information.

11. The method of claim 10, wherein the thermal warm-up regimen includes simulating the writing of a group of spirals of servo information without actually writing said group of spirals of servo information.

12. The method of claim 10, wherein the thermal warm-up regimen includes a pre-amplifier warm-up whereby write gate is turned on, but no spirals of servo information are written.

13. The method of claim 1, wherein a reference track is written onto a disk surface and is used to position a write head to write the spirals of servo information.

14. The method of claim 13, wherein the reference track includes a reference pattern and wherein the reference pattern is a 1f pattern.

15. The method of claim 13, wherein the reference track includes a reference pattern and wherein the reference pattern is a 2f pattern.

16. The method of claim 13 including the steps of:
    moving a read head towards the reference track after writing a spiral of servo information onto the disk surface; and,
    reading said reference track to assist in positioning the write head for writing a next spiral of servo information.

17. An apparatus comprising:
    a disk surface; and,
    a write head for writing information onto the disk surface and a read head for reading information from the disk surface, wherein spirals of servo information are written onto the disk surface using the write head in non-sequential spiral patterns, wherein a first spiral of servo information is completely written before writing a second spiral of servo information.

18. The apparatus of claim 17, wherein no more than three spirals of servo information are written between the time of writing a spiral of servo information and an adjacent spiral of servo information, for all spirals of servo information written onto the disk surface.

19. The apparatus of claim 17, wherein no more than two spirals of servo information are written between the time of writing a spiral of servo information and an adjacent spiral of servo information, for all spirals of servo information written onto the disk surface.

20. The apparatus of claim 17, wherein a thermal warm-up regimen is performed prior to writing the spirals of servo information.

21. The apparatus of claim 20, wherein the thermal warm-up regimen includes simulating the writing of a group of spirals of servo information without actually writing said group of spirals of servo information.

22. The apparatus of claim 20, wherein the thermal warm-up regimen includes a pre-amplifier warm-up whereby write gate is turned on, but no spirals of servo information are written.

23. The apparatus of claim 17, further including a reference track written onto the disk surface, wherein the reference track is used to position the write head to write the spirals of servo information.

24. The apparatus of claim 23, wherein the read head is moved towards the reference track after writing a spiral of servo information onto the disk surface and wherein the reference track is read to assist in positioning the write head for writing a next spiral of servo information.

25. A method comprising the steps of:
providing a disk surface; and,
writing servo information in spiral patterns onto a disk surface in a non-sequential manner, wherein a thermal warm-up regimen is performed prior to writing the spiral patterns.

26. The method of claim 25, wherein the servo information is written using a servo track writer.

27. The method of claim 25, wherein the spiral patterns are written according to a Bisection 180 Degree Pairs technique.

28. The method of claim 25, wherein the spiral patterns are written according to a Sequential 90 Degree Quads technique.

29. The method of claim 25, wherein the spiral patterns are written according to an Hour Glass Modulated 90 Degree Quads technique.

30. The method of claim 25, wherein the spiral patterns are written according to an Hour Glass Modulated 180 Degree Pairs technique.

31. The method of claim 25, wherein the spiral patterns are written according to a Single Step Alternating Modulation technique.

32. The method of claim 25, wherein no more than three spiral patterns are written between the time of writing a first spiral pattern and an adjacent spiral pattern for all spiral patterns written onto the disk surface.

33. The method of claim 25, wherein no more than two spiral patterns are written between the time of writing a first spiral pattern and an adjacent spiral pattern for all spiral patterns written onto the disk surface.

34. The method of claim 25, wherein the thermal warm-up regimen includes simulating the writing of a group of spiral patterns without actually writing said group of spiral patterns.

35. The method of claim 25, wherein the thermal warm-up regimen includes a pre-amplifier warm-up whereby write gate is turned on, but no spiral patterns are written.

36. The method of claim 25, wherein a reference track is written onto a disk surface and is used to position a write head to write the spiral patterns.

37. The method of claim 36, wherein the reference track includes a reference pattern and wherein the reference pattern is a 1f pattern.

38. The method of claim 36, wherein the reference track includes a reference pattern and wherein the reference pattern is a 2f pattern.

39. The method of claim 36 including the steps of:
moving a read head towards the reference track after writing a spiral pattern onto the disk surface; and,
reading said reference track to assist in positioning the write head for writing a next spiral servo pattern.

40. A method comprising the steps of:
providing a disk surface; and,
writing servo information in spiral patterns onto a disk surface in a non-sequential manner, wherein a reference track is written onto a disk surface and is used to position a write head to write spiral patterns.

41. The method of claim 40, wherein the servo information is written using a servo track writer.

42. The method of claim 40, wherein the spiral patterns are written according to a Bisection 180 Degree Pairs technique.

43. The method of claim 40, wherein the spiral patterns are written according to a Sequential 90 Degree Quads technique.

44. The method of claim 40, wherein the spiral patterns are written according to an Hour Glass Modulated 90 Degree Quads technique.

45. The method of claim 40, wherein the spiral patterns are written according to an Hour Glass Modulated 180 Degree Pairs technique.

46. The method of claim 40, wherein the spiral patterns are written according to a Single Step Alternating Modulation technique.

47. The method of claim 40, wherein no more than three spiral patterns are written between the time of writing a first spiral pattern and an adjacent spiral pattern for all spiral patterns written onto the disk surface.

48. The method of claim 40, wherein no more than two spiral patterns are written between the time of writing a first spiral pattern and an adjacent spiral pattern for all spiral patterns written onto the disk surface.

49. The method of claim 40, wherein the reference track includes a reference pattern and wherein the reference pattern is a 1f pattern.

50. The method of claim 40, wherein the reference track includes a reference pattern and wherein the reference pattern is a 2f pattern.

51. The method of claim 40 including the steps of:
moving a read head towards the reference track after writing a spiral pattern onto the disk surface; and,
reading said reference track to assist in positioning the write head for writing a next spiral servo pattern.

52. An apparatus comprising:
a disk surface; and,
a write head for writing information onto the disk surface and a read head for reading information from the disk surface, wherein servo information is written onto the disk surface using the write head in non-sequential spiral patterns, wherein a thermal warm-up regimen is performed prior to writing the spiral patterns.

53. The apparatus of claim 52, wherein no more than three spiral patterns are written between the time of writing a first spiral pattern and an adjacent spiral pattern for all spiral patterns written onto the disk surface.

54. The apparatus of claim 52, wherein no more than two spiral patterns are written between the time of writing a first spiral pattern and an adjacent spiral pattern for all spiral patterns written onto the disk surface.

55. The apparatus of claim 52, wherein the thermal warm-up regimen includes simulating the writing of a group of spiral patterns without actually writing said group of spiral patterns.

56. The apparatus of claim 52, wherein the thermal warm-up regimen includes a pre-amplifier warm-up whereby write gate is turned on, but no spiral patterns are written.

57. The apparatus of claim 52, further including a reference track written onto the disk surface, wherein the reference track is used to position the write head to write the spiral patterns.

58. The apparatus of claim 57, wherein the read head is moved towards the reference track after writing a spiral pattern onto the disk surface and wherein the reference track is read to assist in positioning the write head for writing a next spiral servo pattern.

59. An apparatus comprising:
   a disk surface;
   a write head for writing information onto the disk surface and a read head for reading information from the disk surface;
   a reference track written onto the disk surface, wherein the reference track is used to position the write head to write the spiral patterns.

60. The apparatus of claim 59, wherein no more than three spiral patterns are written between the time of writing a first spiral pattern and an adjacent spiral pattern for all spiral patterns written onto the disk surface.

61. The apparatus of claim 59, wherein no more than two spiral patterns are written between the time of writing a first spiral pattern and an adjacent spiral pattern for all spiral patterns written onto the disk surface.

62. The apparatus of claim 59, wherein the read head is moved towards the reference track after writing a spiral pattern onto the disk surface and wherein the reference track is read to assist in positioning the write head for writing a next spiral servo pattern.

63. A method comprising the steps of:
   providing a disk surface; and,
   writing spirals of servo information onto a disk surface in a non-sequential manner, wherein a thermal warm-up regimen is performed prior to writing the spirals of servo information.

64. A method comprising the steps of:
   providing a disk surface; and,
   writing spirals of servo information onto a disk surface in a non-sequential manner, wherein a reference track is written onto a disk surface and is used to position a write head to write the spirals of servo information.

65. An apparatus comprising:
   a disk surface; and,
   a write head for writing information onto the disk surface and a read head for reading information from the disk surface, wherein spirals of servo information are written onto the disk surface using the write head in non-sequential spiral patterns, wherein a thermal warm-up regimen is performed prior to writing the spirals of servo information.

66. An apparatus comprising:
   a disk surface;
   a write head for writing information onto the disk surface and a read head for reading information from the disk surface, wherein spirals of servo information are written onto the disk surface using the write head in non-sequential spiral patterns;
   a reference track written onto the disk surface, wherein the reference track is used to position the write head to write the spirals of servo information.

* * * * *